United States Patent
Walton et al.

(10) Patent No.: US 8,084,537 B2
(45) Date of Patent: Dec. 27, 2011

(54) POLYMER BLENDS FROM INTERPOLYMERS OF ETHYLENE/α-OLEFIN WITH IMPROVED COMPATIBILITY

(75) Inventors: Kim L. Walton, Lake Jackson, TX (US); Morgan M. Hughes, Angleton, TX (US); Yunwa W. Cheung, Somerset, NJ (US)

(73) Assignee: Dow Global Technologies LLC, Midland, MI (US)

( * ) Notice: Subject to any disclaimer, the term of this patent is extended or adjusted under 35 U.S.C. 154(b) by 1 day.

(21) Appl. No.: 11/908,948

(22) PCT Filed: Mar. 15, 2006

(86) PCT No.: PCT/US2006/009402
§ 371 (c)(1),
(2), (4) Date: May 21, 2008

(87) PCT Pub. No.: WO2006/101924
PCT Pub. Date: Sep. 28, 2006

(65) Prior Publication Data
US 2009/0105417 A1    Apr. 23, 2009

(30) Foreign Application Priority Data
Mar. 17, 2005    (WO) ................ PCT/US2005/008917

(51) Int. Cl.
*C08L 53/00* (2006.01)
(52) U.S. Cl. .......................................................... 525/88
(58) Field of Classification Search .................... 525/88
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 3,873,642 A | 3/1975 | Jezl | |
| 4,146,492 A | 3/1979 | Cusano et al. | |
| 4,299,931 A | 11/1981 | Coran et al. | |
| 4,429,079 A | 1/1984 | Shibata et al. | |
| 4,510,031 A | 4/1985 | Matsumura et al. | |
| 4,668,752 A | 5/1987 | Tominari et al. | |
| 4,780,228 A | 10/1988 | Gardiner et al. | |
| 4,798,081 A | 1/1989 | Hazlitt et al. | |
| 5,068,047 A | 11/1991 | Chung et al. | |

(Continued)

FOREIGN PATENT DOCUMENTS
EP    287282 A1    10/1988
(Continued)

OTHER PUBLICATIONS

Nitta et al., "Polypropylene-block-poly(ehtylene-co-propylene) addition to . . . ", 41 Polymer (2000), pp. 6765-6771.

(Continued)

*Primary Examiner* — Mark Eashoo
*Assistant Examiner* — David Karst
(74) *Attorney, Agent, or Firm* — Whyte Hirschboeck Dudek SC

(57) ABSTRACT

Disclosed herein are polymer blends comprising at least one ethylene/α-olefin interpolymer and two different poly-olefins which can be homopolymers. The ethylene/α-olefin interpolymers are block copolymers comprising at least a hard block and at least a soft block. In some embodiments, the ethylene/α-olefin interpolymer can function as a compatibilizer between the two polyolefins which may not be otherwise compatible. Methods of making the polymer blends and molded articles made from the polymer blends are also described.

19 Claims, 9 Drawing Sheets

U.S. PATENT DOCUMENTS

| | | |
|---|---|---|
| 5,266,626 A | 11/1993 | Hert et al. |
| 5,322,728 A | 6/1994 | Davey et al. |
| 5,391,629 A | 2/1995 | Turner et al. |
| 5,468,810 A | 11/1995 | Hayakawa et al. |
| 5,594,080 A | 1/1997 | Waymouth et al. |
| 5,597,881 A | 1/1997 | Winter et al. |
| 5,610,253 A | 3/1997 | Hatke et al. |
| 5,624,991 A | 4/1997 | Harada et al. |
| 5,733,980 A | 3/1998 | Cozewith et al. |
| 5,773,155 A | 6/1998 | Kale et al. |
| 5,783,531 A | 7/1998 | Andrew et al. |
| 5,798,420 A * | 8/1998 | Cozewith et al. ............ 525/323 |
| 5,868,984 A | 2/1999 | Winter et al. |
| 5,892,076 A | 4/1999 | Nickias |
| 5,916,953 A | 6/1999 | Jacoby et al. |
| 5,969,070 A | 10/1999 | Waymouth et al. |
| 5,994,255 A | 11/1999 | Nickias et al. |
| 6,008,262 A | 12/1999 | McKay et al. |
| 6,025,448 A | 2/2000 | Swindoll et al. |
| 6,096,668 A | 8/2000 | Abuto et al. |
| 6,114,457 A | 9/2000 | Markel et al. |
| 6,121,402 A | 9/2000 | Machida et al. |
| 6,124,400 A | 9/2000 | Chien |
| 6,136,937 A | 10/2000 | Lai et al. |
| 6,143,828 A | 11/2000 | Chee et al. |
| 6,147,180 A | 11/2000 | Markel et al. |
| 6,160,029 A | 12/2000 | Chaudhary et al. |
| 6,177,377 B1 | 1/2001 | Chien et al. |
| 6,187,424 B1 | 2/2001 | Kjellqvist et al. |
| 6,197,404 B1 | 3/2001 | Varona |
| 6,262,203 B1 | 7/2001 | Chien et al. |
| 6,287,705 B1 | 9/2001 | Seta et al. |
| 6,306,973 B1 * | 10/2001 | Takaoka et al. ............... 525/240 |
| 6,362,252 B1 | 3/2002 | Prutkin |
| 6,376,095 B1 * | 4/2002 | Cheung et al. ................ 428/516 |
| 6,455,638 B2 | 9/2002 | Laughner et al. |
| 6,537,472 B2 | 3/2003 | Masubuchi |
| 6,566,446 B1 | 5/2003 | Parikh et al. |
| 6,566,544 B1 | 5/2003 | Waymouth et al. |
| 6,815,023 B1 | 11/2004 | Tatarka et al. |
| 6,825,280 B1 * | 11/2004 | Hayakawa et al. .......... 525/240 |
| 7,005,395 B2 | 2/2006 | Zafiroglu et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 2001/0039314 A1 | 11/2001 | Mehta et al. |
| 2003/0027954 A1 | 2/2003 | Becke et al. |
| 2003/0120012 A1* | 6/2003 | Cheung et al. ................ 526/347 |
| 2003/0194575 A1 | 10/2003 | Tau et al. |
| 2003/0195128 A1 | 10/2003 | Deckman et al. |
| 2003/0216518 A1 | 11/2003 | Tau et al. |
| 2004/0077787 A1* | 4/2004 | Karande et al. ................. 525/88 |
| 2004/0082750 A1 | 4/2004 | Tau et al. |
| 2004/0092662 A1 | 5/2004 | Goto et al. |
| 2004/0121922 A1 | 6/2004 | Okada et al. |
| 2004/0158011 A1 | 8/2004 | Jain et al. |
| 2004/0192147 A1 | 9/2004 | Smith et al. |
| 2005/0009993 A1 | 1/2005 | Morioka et al. |
| 2005/0176892 A1 | 8/2005 | Weaver et al. |
| 2006/0030667 A1 | 2/2006 | Yalvac et al. |
| 2006/0198983 A1 | 9/2006 | Patel |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2008/0299857 A1 | 12/2008 | Harding et al. |

FOREIGN PATENT DOCUMENTS

| | | |
|---|---|---|
| EP | 0 274 906 | 7/1998 |
| EP | 0 877 050 | 11/1998 |
| EP | 0 982 328 | 3/2000 |
| EP | 1 002 814 | 5/2000 |
| EP | 1 026 184 | 8/2000 |
| EP | 1 097 976 | 5/2001 |
| EP | 1 162 213 | 12/2001 |
| EP | 0 958 313 | 9/2002 |
| EP | 1 262 498 | 12/2002 |
| EP | 1 262 498 A2 | 12/2002 |
| EP | 1 375 585 | 1/2004 |
| EP | 1 588 843 | 10/2005 |
| JP | 2002-206007 | 7/2002 |
| JP | 2004-204058 | 7/2004 |
| WO | WO 95/27745 | 10/1995 |
| WO | WO 95/27746 | 10/1995 |
| WO | 96/12762 A1 | 5/1996 |
| WO | 97/12919 A1 | 4/1997 |
| WO | WO 98/05731 | 2/1998 |
| WO | WO 98/34970 | 8/1998 |
| WO | WO 99/35171 | 7/1999 |
| WO | WO 00/37514 | 6/2000 |
| WO | WO 02/066540 | 8/2002 |
| WO | WO 02/079322 | 10/2002 |
| WO | WO 03/014046 | 2/2003 |
| WO | WO 03/040201 | 5/2003 |
| WO | WO 03/082971 | 10/2003 |
| WO | WO 2005/090425 | 9/2005 |
| WO | WO 2005/090426 | 9/2005 |
| WO | WO 2005/090426 A1 | 9/2005 |
| WO | WO 2005/090427 | 9/2005 |

OTHER PUBLICATIONS

Tanem et al., "Blends of single-site linear and branched polyethylene. I. Thermal characterization", 42(12) Polymer (2001), pp. 5389-5399.

Nitta et al., Polymer, 41(18), 2000, 6765-6771.

* cited by examiner

POLYMER BLENDS FROM INTERPOLYMERS OF ETHYLENE/α-OLEFIN WITH IMPROVED COMPATIBILITY

FIELD OF THE INVENTION

This invention relates to polymer blends made from an ethylene/α-olefin interpolymer and at least two polyolefins, methods of making the blends, and articles made from the blends.

BACKGROUND OF THE INVENTION

Multiphase polymer blends are of major economic importance in the polymer industry. Some examples of the multiphase polymer blends involve the impact modification of thermoplastics by the dispersion of rubber modifiers into the thermoplastic matrixes. In general, commercial polymer blends consist of two or more polymers combined with small amounts of a compatibilizer or an interfacial agent. Generally, the compatibilizers or interfacial agents are block or graft copolymers which can promote the forming of small rubber domains in the polymer blends so as to improve their impact strength.

In many applications, blends of polypropylene (PP) and ethylene/α-olefin copolymers are used. The ethylene/α-olefin copolymer functions as a rubber modifier in the blends and provides toughness and good impact strength. In general, the impact efficiency of the ethylene/α-olefin copolymer may be a function of a) the glass transition (Tg) of the rubber modifier, b) the adhesion of the rubber modifier to the polypropylene interface, and c) the difference in the viscosities of the rubber modifier and polypropylene. The Tg of the rubber modifier can be improved by various methods such as decreasing the crystallinity of the α-olefin component. Similarly, the viscosity difference of the rubber modifier and polypropylene can be optimized by various techniques such as adjusting the molecular weight and molecular weight distribution of the rubber modifier. For ethylene/higher alpha-olefin (HAO) copolymers, the interfacial adhesion of the copolymer can be increased by increasing the amount of the HAO. However, when the amount of the HAO is greater than 55 mole % in the ethylene/HAO copolymer, the polypropylene become miscible with the ethylene/HAO copolymer and they form a single phase and there are no small rubber domains. Therefore, the ethylene/HAO copolymer with greater than 55 mole % of HAO has a limited utility as an impact modifier.

For thermoplastic vulcanizates (TPV's) where the rubber domains are crosslinked, it is desirable to improve properties such as compression set and tensile strength. These desirable properties can be improved by decreasing the average rubber particle size. During the dynamic vulcanization step of TPV's comprising polypropylene and a polyolefin interpolymer such as ethylene/alpha-olefin/diene terpolymers (e.g., ethylene/propylene/diene terpolymer (EPDM)), there must be a balance of compatibility of the terpolymer with the polypropylene. In general, EPDM has a good compatibility with polypropylene, but the compatibility can only be marginally improved with increasing propylene level in EPDM.

Despite the availability of a variety of polymer blends, there is a need to continue to develop polymer blends with improved properties.

SUMMARY OF THE INVENTION

The aforementioned needs are met by various aspects of the invention. In one aspect, the invention relates to polymer blends comprising: (i) a first polyolefin; (ii) a second polyolefin; and (iii) an ethylene/α-olefin interpolymer, wherein the first polyolefin, the second polyolefin and the ethylene/α-olefin interpolymer are different. The term "different" when referring to two polyolefins means that the two polyolefins differ in composition (comonomer type, comonomer content, etc.), structure, properties, or a combination thereof. For example, a block ethylene/octene copolymer is different than a random ethylene/octene copolymer, even if they have the same amount of comonomers. A block ethylene/octene copolymer is different than an ethylene/butane copolymer, regardless of whether it is a random or block copolymer or whether it has the same comonomer content. Two polyolefins also are considered different if they have a different molecular weight, even though they have the same structure and composition. Moreover, a random homogeneous ethylene/octene copolymer is different than a random heterogenous ethylene/octene copolymer, even if all other parameters may be the same.

The ethylene/α-olefin interpolymer used in the polymer blends has one or more of the following characterstics:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2, \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1.

In one embodiment, the ethylene/α-olefin interpolymer has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm \geq 858.91-1825.3(d)+1112.8(d)^2.$$

In another embodiment, the ethylene/α-olefin interpolymer has a Mw/Mn from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H)+62.81 \text{ for } \Delta H \text{ greater than zero and up to 130 J/g,}$$

$$\Delta T \geq 48°\text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

In one embodiment, the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase: Re>1481−1629(d), Re>1491−1629(d), Re>1501−1629(d), or Re>1511-1629(d).

In some embodiments, the polymer blend comprises (i) a first polyolefin; (ii) a second polyolefin; and (iii) an ethylene/α-olefin interpolymer, wherein the first polyolefin, the second polyolefin and the ethylene/α-olefin interpolymer are different. In one embodiment, the ethylene/α-olefin interpolymer has:

(a) at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3 or (b) an average block index greater than zero and up to about 1.0 and a molecular weight distribution, Mw/Mn, greater than about 1.3.

In other embodiments, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer.

In some embodiments, the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

In one embodiment, the ethylene/α-olefin interpolymer is a random block copolymer comprising at least a hard block and at least a soft block. In another embodiment, ethylene/α-olefin interpolymer is a random block copolymer comprising multiple hard blocks and multiple soft blocks, and the hard blocks and soft blocks are random distributed in a polymeric chain.

In one embodiment, the α-olefin in the polymer blends provided herein is a C4-40 α-olefin. In another embodiment, the α-olefin is styrene, propylene, 1-butene, 1-hexene, 1-octene, 4-methyl-1-pentene, norbornene, 1-decene, 1,5-hexadiene, or a combination thereof.

In some embodiments, the ethylene/α-olefin interpolymer has a melt index in the range of about 0.1 to about 2000 g/10 minutes, about 1 to about 1500 g/10 minutes, about 2 to about 1000 g/10 minutes, or about 5 to about 500 g/10 minutes measured according to ASTM D-1238, Condition 190° C./2.16 kg.

In some embodiments, the amount of the ethylene/α-olefin interpolymer in the polymer blends provided herein is from about 0.5% to about 99%, from about 1% to about 50%, from about 2 to about 25%, from about 3 to about 15%, or from about 5 to about 10% by weight of the total composition.

In other embodiments, the ethylene/α-olefin interpolymer contains soft segments having an α-olefin content greater than 30 mole %, greater than 35 mole %, greater than 40 mole %, greater than 45 mole % or greater than 55 mole %. In one embodiment, the elastomeric polymer contains soft segments having an α-olefin content greater than 55 mole %.

In some embodiments, the ethylene/α-olefin interpolymer in the polymer blend comprises an elastomeric polymer having an ethylene content of from 5 to 95 mole percent, a diene content of from 5 to 95 mole percent, and an α-olefin content of from 5 to 95 mole percent. The α-olefin in the elastomeric polymer can be a C4-40 α-olefin.

In some embodiments, the amount of the first polyolefin in the polymer blends is from about 0.5 to about 99 wt % of the total weight of the polymer blend. In some embodiments, the amount of the second polyolefin in the polymer blends is from about 0.5 to about 99 wt % of the total weight of the polymer blend.

In one embodiment, the first polyolefin is an olefin homopolymer, such as polypropylene. The polypropelene for use herein includes, but is not limited to a low density polypropylene (LDPP), high density polypropylene (HDPP), high melt strength polypropylene (HMS-PP), high impact polypropylene (HIPP), isotactic polypropylene (iPP), syndiotactic polypropylene (sPP) and a combination thereof. In one embodiment, the polypropylene is isotactic polypropylene.

In another embodiment, the second polyolefin is an olefin copolymer, an olefin terpolymer or a combination thereof. The olefin copolymer can be derived from ethylene and a monoene having 3 or more carbon atoms. Exemplary olefin copolymers are ethylene/alpha-olefin (EAO) copolymers and ethylene/propylene copolymers (EPM). The olefin terpolymer for use in the polymer blends can be derived from ethylene, a monoene having 3 or more carbon atoms, and a diene and include, but are not limited to, ethylene/alpha-olefin/diene terpolymer (EAODM) and ethylene/propylene/diene terpolymer (EPDM). In one embodiment, the second polyolefin is a vulcanizable rubber.

In some embodiments, the polymer blend further comprises at least one additive, such as a slip agent, an antiblocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof.

Also provided herein are molded articles comprising the polymer blend. Exemplary molded articles include a tire, a hose, a belt, a gasket, a shoe sole, a molding or a molded part. Such molded articles can be prepared by injection molding, extrusion blow molding or injection blow molding. In one embodiment, the molded article is foamed by a chemical or physical blowing agent.

Further provided herein are sheet articles, profile articles and film articles comprising at least a layer comprising the polymer blend provided herein. In one embodiment, the sheet article is prepared by extrusion or calendering. In another embodiment, the sheet article is foamed by a chemical or physical blowing agent. Also provided herein is a thermoformed article comprising the sheet. In certain embodiments, the profile and film articles can be prepared by extrusion.

Also provided herein are methods of making a polymer blend, comprising blending a first polyolefin, a second polyolefin and an ethylene/α-olefin interpolymer, wherein the first polyolefin, the second polyolefin and the ethylene/α-olefin interpolymer are different. The ethylene/α-olefin interpolymer used in the polymer blends is as described above and elsewhere herein.

Additional aspects of the invention and characteristics and properties of various embodiments of the invention become apparent with the following description.

DETAILED DESCRIPTION OF THE INVENTION

General Definitions

Figure 1:
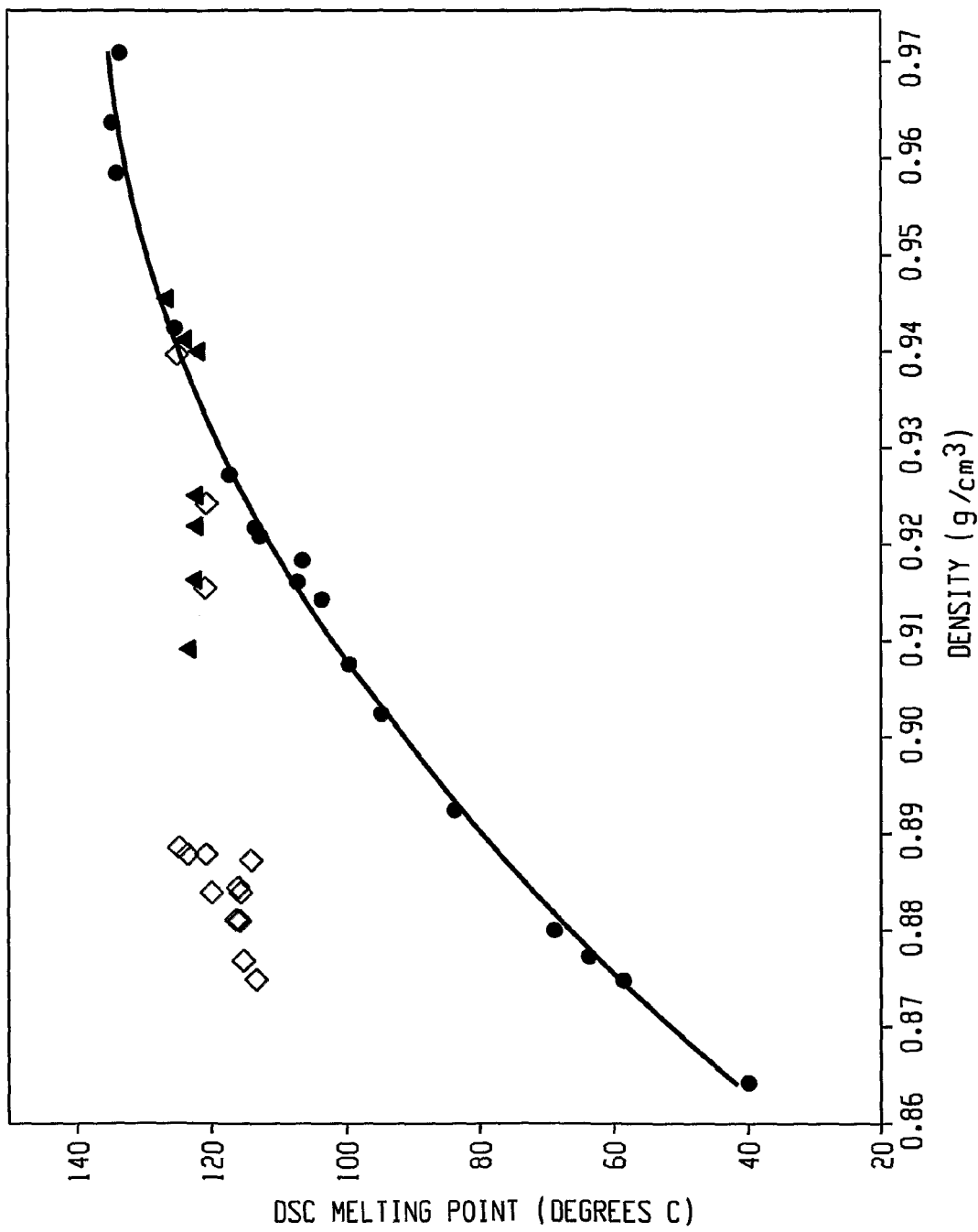
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula:

(AB)

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

The term "compatibilizer" refers to a polymer that, when added to an immiscible polymer blend, can increase the miscibility of the two polymers resulting in an increased stability in the blend. In some embodiments, the compatabilizer can reduce the average domain size by at least 20%, more preferably at least 30%, at least 40%, or at least 50%, when about 15 weight percent of the compatibilizer is added to the blend. In other embodiments, the compatabilizer can increase the miscibility of two or more polymers by at least 10%, more preferably at least 20%, at least 30%, at least 40%, or at least 50%, when about 15 weight percent of the compatibilizer is added to the blend.

The term "immiscible" refers to two polymers when they do not form a homogenous mixture after being mixed. In other words, phase separation occurs in the mixture. One method to quantify the immiscibility of two polymers is to use Hildbrand's solubility parameter which is a measure of the total forces holding the molecules of a solid or liquid together. Every polymer is characterized by a specific value of solubility parameter, although it is not always available. Polymers with similar solubility parameter values tend to be miscible. On the other hand, those with significantly different solubility parameters tend to be immiscible, although there are many exceptions to this behavior. Discussions of solubility parameter concepts are presented in (1) Encyclopedia of Polymer Science and Technology, Interscience, New York (1965), Vol. 3, pg. 833; (2) Encyclopedia of Chemical Technology, Interscience, New York (1971), Supp. Vol., pg. 889; and (3) Polymer Handbook, 3rd Ed., J. Brandup and E. H. Immergut (Eds.), (1989), John Wiley & Sons "Solubility Parameter Values," pp. VII-519, which are incorporated by reference in their entirety herein.

The term "interfacial agent" refers to an additive that reduces the interfacial energy between phase domains.

The term "olefin" refers to a hydrocarbon contains at least one carbon-carbon double bond.

The term "thermoplastic vulcanizate" (TPV) refers to an engineering thermoplastic elastomer in which a cured elastomeric phase is dispersed in a thermoplastic matrix. The TPV generally comprises at least one thermoplastic material and at least one cured (i.e., cross-linked) elastomeric material. In some embodiments, the thermoplastic material forms the continuous phase, and the cured elastomer forms the discrete phase; that is, domains of the cured elastomer are dispersed in the thermoplastic matrix. In other embodiments, the domains of the cured elastomer are fully and uniformly dispersed with the average domain size in the range from about 0.1 micron to about 100 micron, from about 1 micron to about 50 microns; from about 1 micron to about 25 microns; from about 1 micron to about 10 microns, or from about 1 micron to about 5 microns. In certain embodiments, the matrix phase of the TPV is present by less than about 50% by volume of the TPV, and the dispersed phase is present by at least about 50% by volume of the TPV. In other words, the crosslinked elastomeric phase is the major phase in the TPV, whereas the thermoplastic polymer is the minor phase. TPVs with such phase composition can have good compression set. However, TPVs with the major phase being the thermoplastic polymer and the minor phase being the cross-linked elastomer may also be made. Generally, the cured elastomer has a portion that is insoluble in cyclohexane at 23° C. The amount of the insoluble portion is preferably more than about 75% or about 85%. In some cases, the insoluble amount is more than about 90%, more than about 93%, more than about 95% or more than about 97% by weight of the total elastomer.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Embodiments of the invention provide polymer blends comprising at least one ethylene/α-olefin interpolymer and at least two polyolefins. The polymer blends with improved compatibility possess unique physical and mechanical properties that are suitable for making molded articles for a variety of applications. The ethylene/α-olefin interpolymer can improve the compatibility of the two polyolefins which otherwise may be relatively incompatible. In other words, the interpolymer is a compatibilizer between two or more polyolefins.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
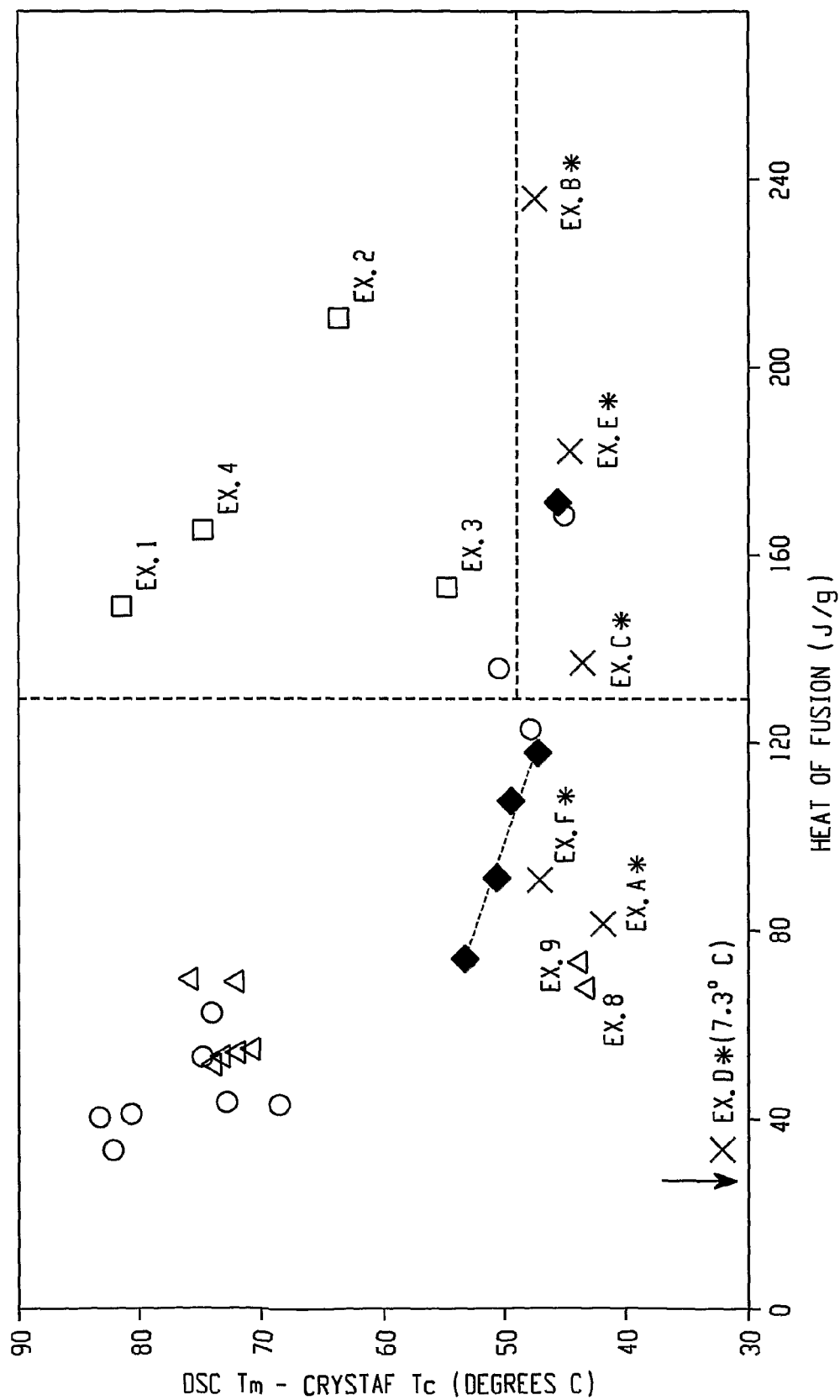
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; and preferably $Re \geq 1491 - 1629(d)$; and more preferably $Re \geq 1501 - 1629(d)$; and even more preferably $Re \geq 1511 - 1629(d)$.

Figure 3:
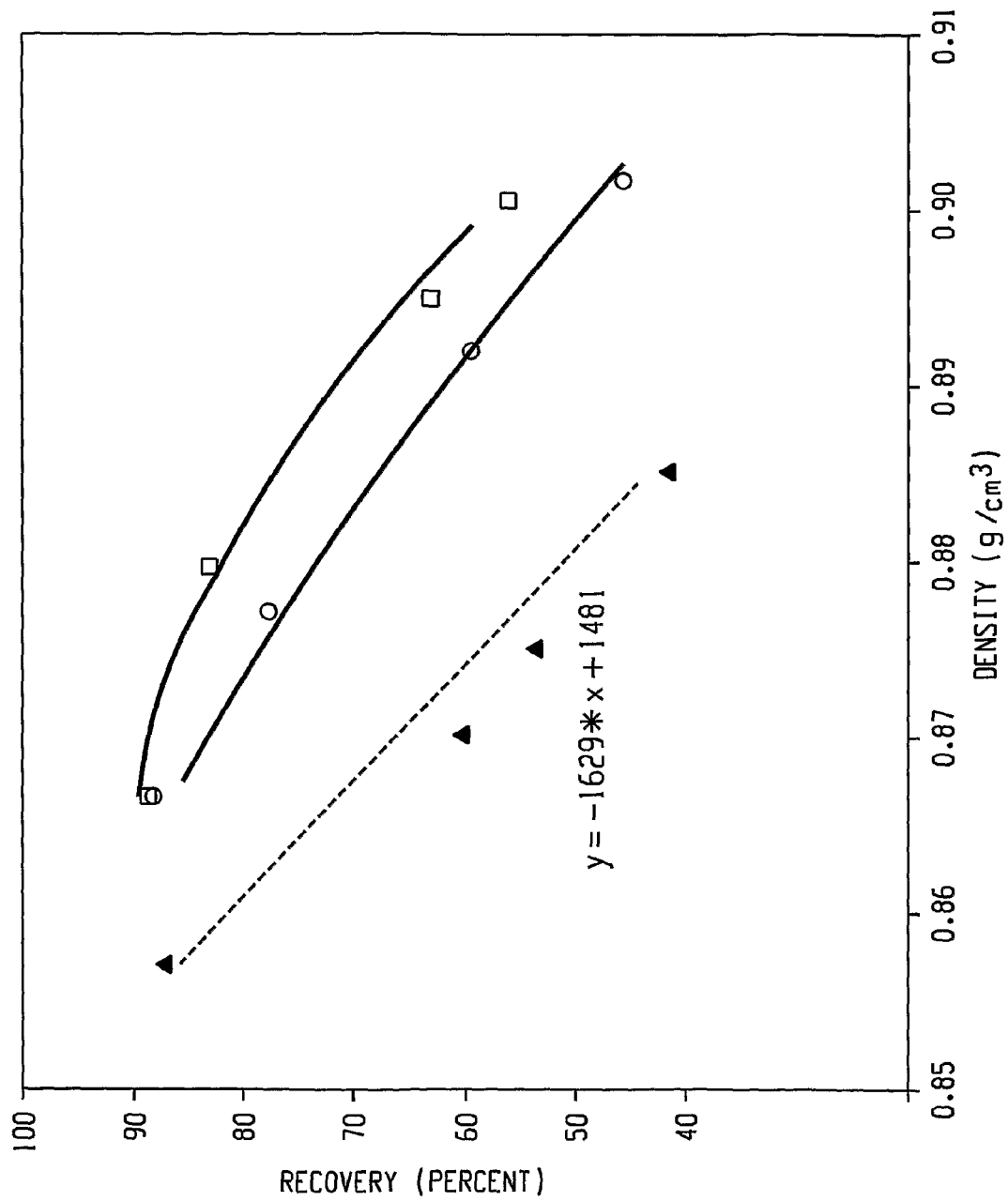
FIG. 3 shows the effect of density on elastic recovery for unoriented films comprising inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films comprising certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength $\geq 11$ MPa, more preferably a tensile strength $\geq 13$ MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, $G'(25° C.)/G'(100° C.)$, of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity $(-0.2013) T + 20.07$, more preferably greater than or equal to the quantity $(-0.2013) T + 21.07$, where T is the numerical value of the peak elution temperature of the TREF fraction being compared, measured in ° C.

Figure 4:
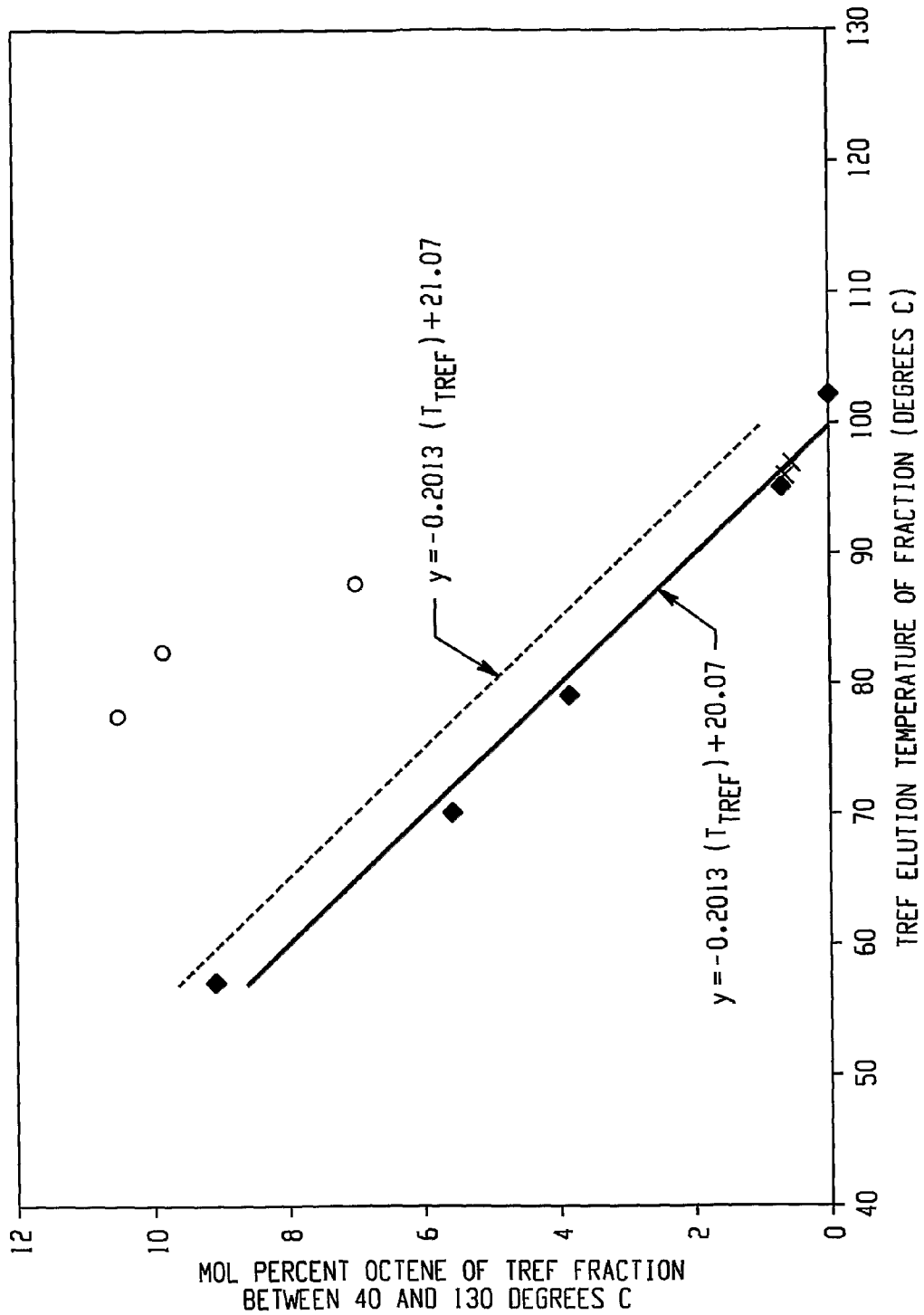
FIG. 4 is a plot of octene content of TREF fractionated ethylene/1-octene copolymer fractions versus TREF elution temperature of the fraction for the polymer of Example 5 (represented by the circles) and Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing $(-0.2013) T + 20.07$ (solid line). The line for the equation $(-0.2013) T + 21.07$ is depicted by a dotted line. Also depicted are the comonomer contents for fractions of several block ethylene/

1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
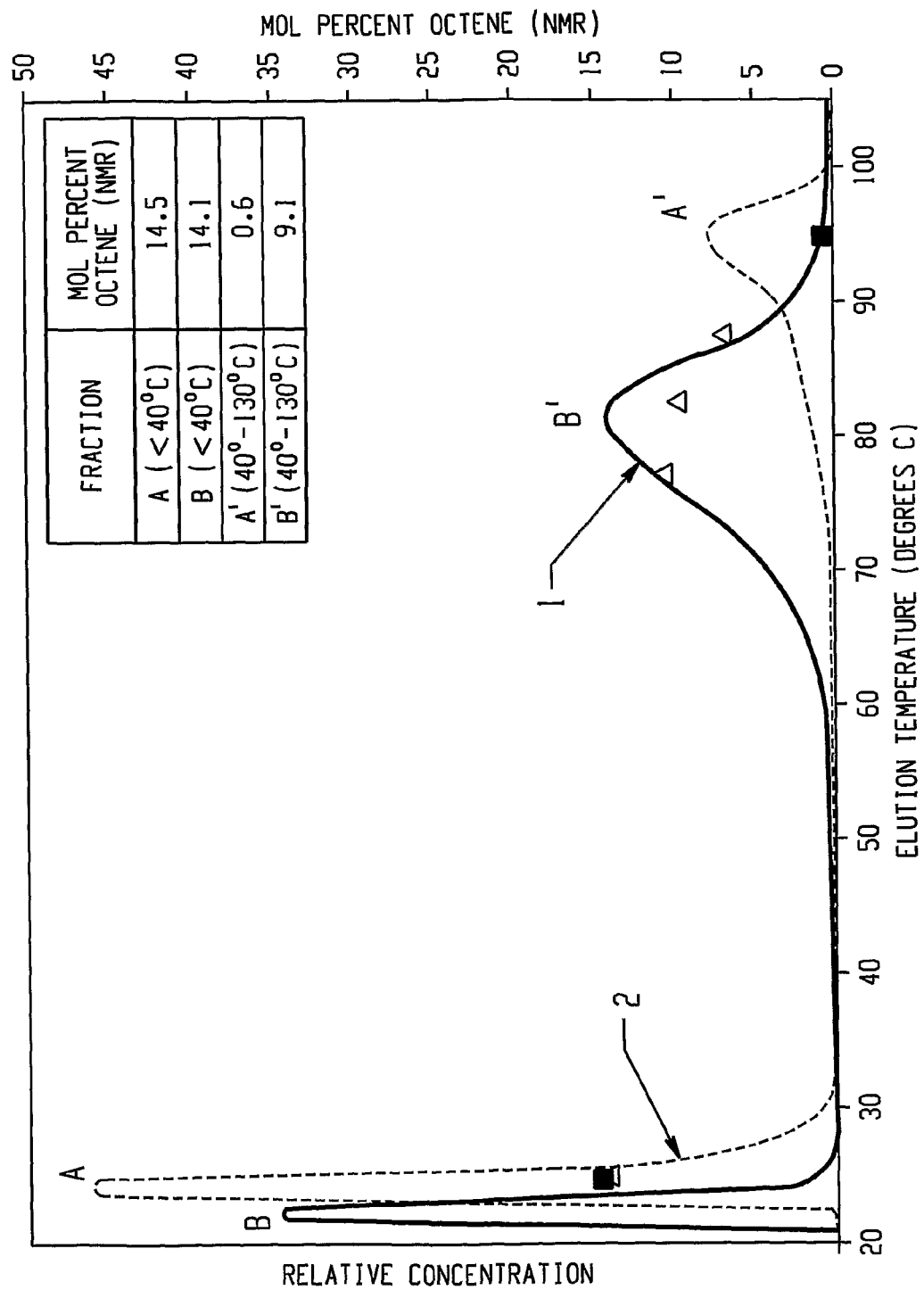
FIG. 5 is a plot of octene content of TREF fractionated ethylene/1-octene copolymer fractions versus TREF elution temperature of the fraction for the polymer of Example 5 (curve 1) and for Comparative Example F* (curve 2). The squares represent Example F*; and the triangles represent Example 5.

FIG. 5 graphically displays the TREF curve and comonomer contents of polymer fractions for Example 5 and Comparative Example F* to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356)T+13.89, more preferably greater than or equal to the quantity (−0.1356)T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer).

As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
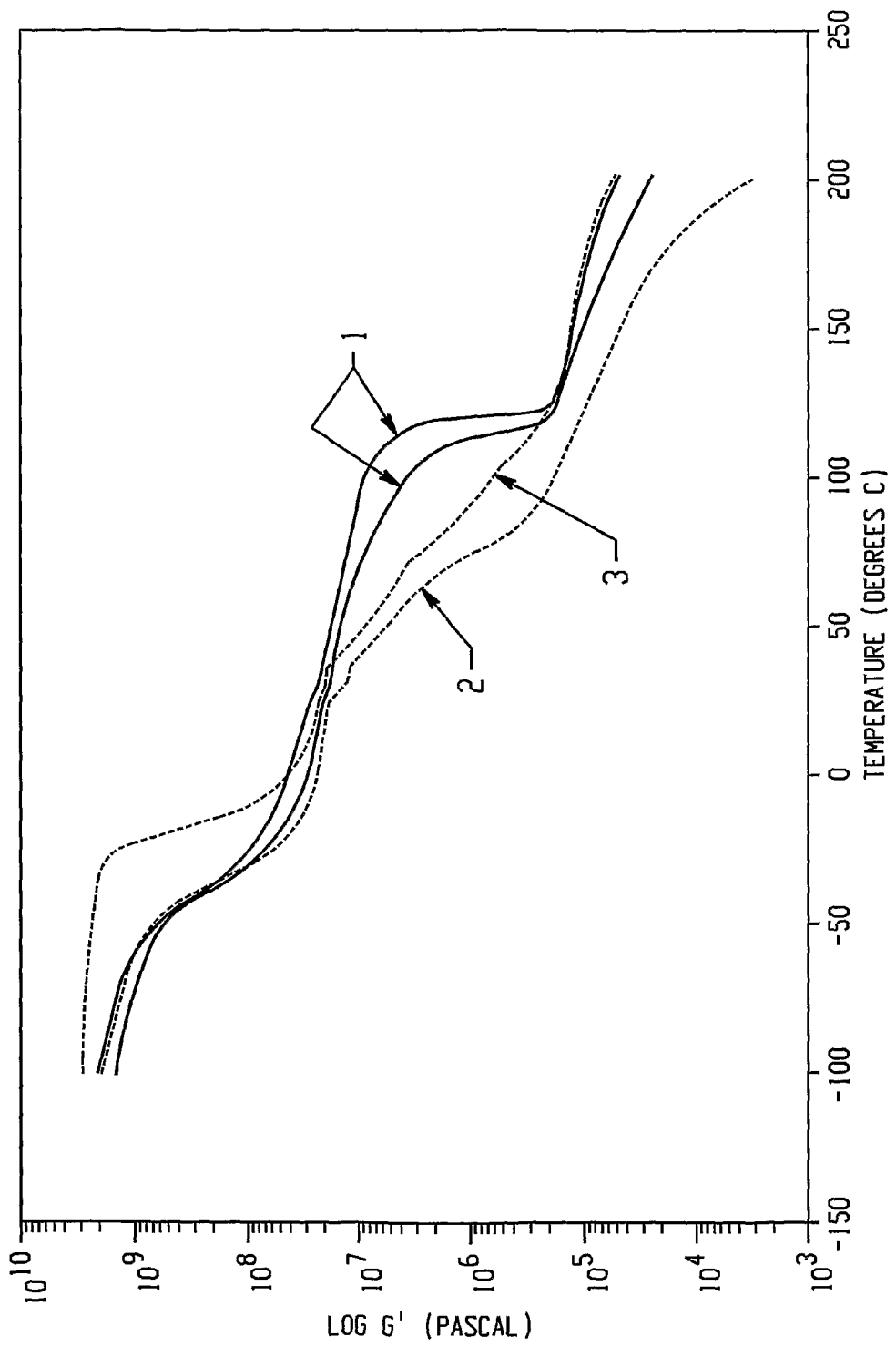
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
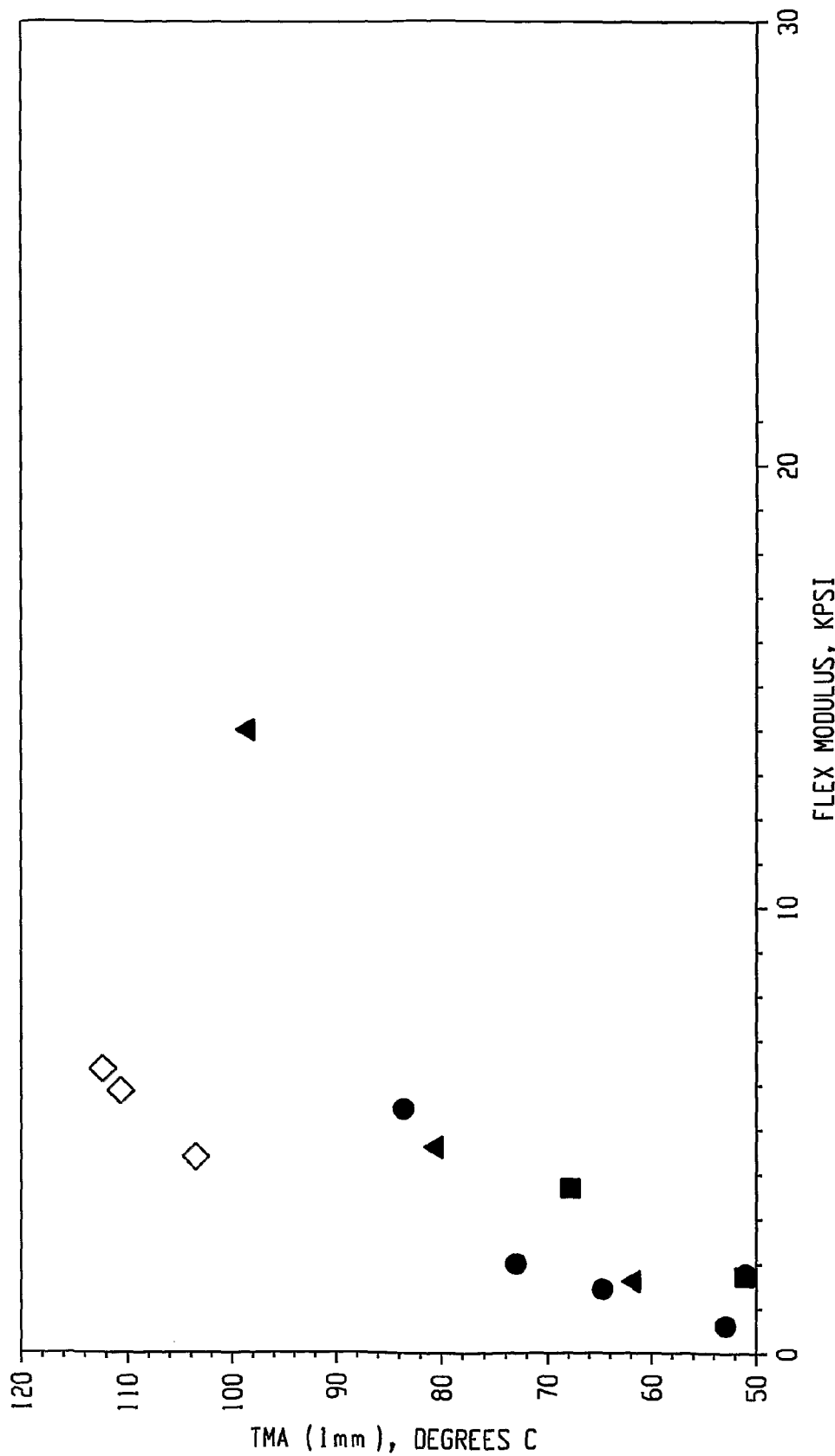
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, I2, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, I2, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/562,938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

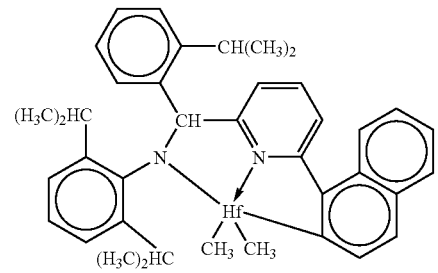

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

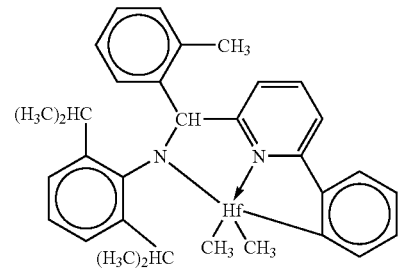

Catalyst (A3) is bis[N,N'''-(2,4,6-tri(methylphenyl)amido)ethylenediamine]hafnium dibenzyl.

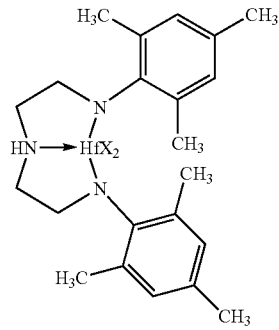

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

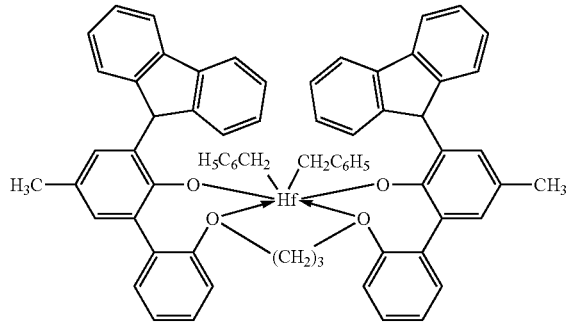

Catalyst (B1) is 1,2-bis-(3,5-di-t-butylphenylene)(1-(N-(1-methylethyl)immino)methyl)(2-oxoyl) zirconium dibenzyl

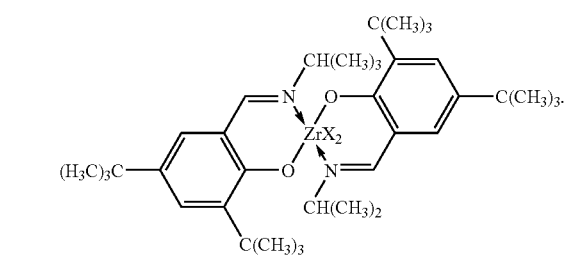

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibnzyl

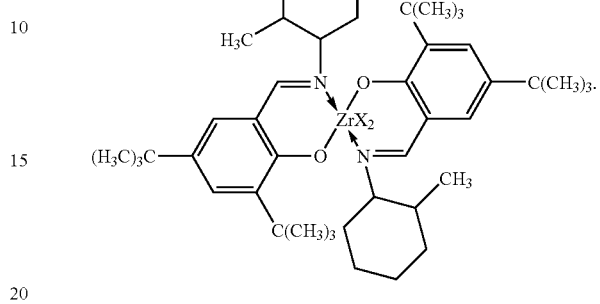

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

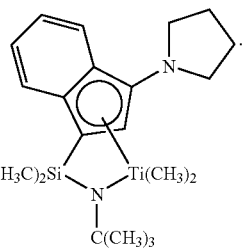

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

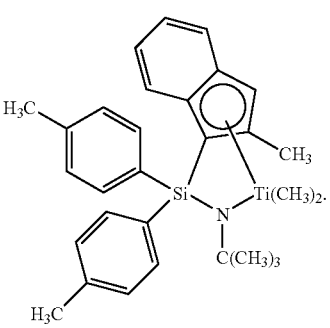

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

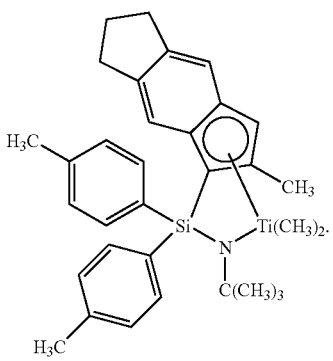

Catalyst (D1) is bis(dimethyldisiloxane)(indene-1-yl)zirconium dichloride available from Sigma-Aldrich:

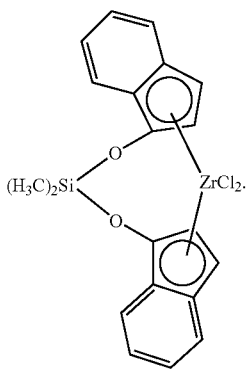

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The amount of the ethylene/α-olefin interpolymer in the polymer blends disclosed herein depends upon several factors, such as the type and amount of the two polyolefins. Generally, the amount should be sufficient to be effective as a compatibilizer as described above. In some embodiments, it should be an a sufficient amount to effect morphology changes between the two polymers in the resulting blend. Typically the amount can be from about 0.5 to about 99 wt %, from about 5 to about 95 wt %, from about 10 to about 90 wt %, from about 20 to about 80 wt %, from about 0.5 to about 50 wt %, from about 50 to about 99 wt %, from about 5 to about 50 wt %, or from about 50 to about 95 wt % of the total weight of the polymer blend. In some embodiments, the amount of the ethylene/α-olefin interpolymer in the polymer blends is from about 1% to about 30%, from about 2% to about 20%, from about 3% to about 15%, from about 4% to about 10% by weight of the total weight of the polymer blend. In some embodiments, the amount of the ethylene/α-olefin interpolymer in the polymer blends is less than about 50%, less than about 40%, less than about 30%, less than about 20%, less than about 15%, less than about 10%, less than about 9%, less than about 8%, less than about 7%, less than about 6%, less than about 5%, less than about 4%, less than about 3%, less than about 2% or less than about 1%, but greater than about 0.1% by weight of the total polymer blend.

Polyolefins

The polymer blends disclosed herein can comprise at least two polyoelfins, in addition to at least an ethylene/α-olefin interpolymer described above. A polyolefin is a polymer derived from two or more olefins (i.e., alkenes). An olefin (i.e., alkene) is a hydrocarbon contains at least one carbon-carbon double bond. The olefin can be a monoene (i.e, an olefin having a single carbon-carbon double bond), diene (i.e, an olefin having two carbon-carbon double bonds), triene (i.e, an olefin having three carbon-carbon double bonds), tetraene (i.e, an olefin having four carbon-carbon double bonds), and other polyenes. The olefin or alkene, such as monoene, diene, triene, tetraene and other polyenes, can have 3 or more carbon atoms, 4 or more carbon atoms, 6 or more carbon atoms, 8 or more carbon atoms. In some embodiments, the olefin has from 3 to about 100 carbon atoms, from 4 to about 100 carbon atoms, from 6 to about 100 carbon atoms, from 8 to about 100 carbon atoms, from 3 to about 50 carbon atoms, from 3 to about 25 carbon atoms, from 4 to about 25 carbon atoms, from 6 to about 25 carbon atoms, from 8 to about 25 carbon atoms, or from 3 to about 10 carbon atoms. In some embodiments, the olefin is a linear or branched, cyclic or acyclic, monoene having from 2 to about 20 carbon atoms. In other embodiments, the alkene is a diene such as butadiene and 1,5-hexadiene. In further embodiments, at least one of the hydrogen atoms of the alkene is substituted with an alkyl or aryl. In particular embodiments, the alkene is ethylene, propylene, 1-butene, 1-hexene, 1-octene, 1-decene, 4-methyl-1-pentene, norbornene, 1-decene, butadiene, 1,5-hexadiene, styrene or a combination thereof.

The amount of the polyolefins in the polymer blend can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend. In one embodiment, the amount of the polyolefins in the polymer blend is about 50%, 60%, 70% or 80% by total weight of the polymer blend. The weight ratio of the two polyolefins can range from about 1:99 to about 99:1, preferable from about 5:95 to about 95:5, from about 10:90 to about 90:10, from about 20:80 to about 80:20, from about 30:70 to about 70:30, from about 40:60 to about 60:40, from about 45:55 to about 55:45 to about 50:50.

Any polyolefin known to a person of ordinary skill in the art may be used to prepare the polymer blend disclosed herein. The polyolefins can be olefin homopolymers, olefin copolymers, olefin terpolymers, olefin quaterpolymers and the like, and combinations thereof.

In some embodiments, one of the at least two polyolefins is an olefin homopolymer. The olefin homopolymer can be derived from one olefin. Any olefin homopolymer known to a person of ordinary skill in the art may be used. Non-limiting examples of olefin homopolymers include polyethylene (e.g., ultralow, low, linear low, medium, high and ultrahigh density polyethylene), polypropylene, polybutylene (e.g., polybutene-1), polypentene-1, polyhexene-1, polyoctene-1, polydecene-1, poly-3-methylbutene-1, poly-4-methylpentene-1, polyisoprene, polybutadiene, poly-1,5-hexadiene.

In further embodiments, the olefin homopolymer is a polypropylene. Any polypropylene known to a person of ordinary skill in the art may be used to prepare the polymer blends disclosed herein. Non-limiting examples of polypropylene include low density polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof.

The amount of the polypropylene in the polymer blend can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend. In one embodiment, the amount of the polypropylene in the polymer blend is about 50%, 60%, 70% or 80% by total weight of the polymer blend.

In other embodiments, one of the at least two polyolefins is an olefin copolymer. The olefin copolymer can be derived from two different olefins. The amount of the olefin copolymer in the polymer blend can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend. In some embodiments, the amount of the olefin copolymer in the polymer blend is about 10%, 15%, 20%, 25%, 30%, 35%, 40% or 50% of the total weight of the polymer blend.

Any olefin copolymer known to a person of ordinary skill in the art may be used in the polymer blends disclosed herein. Non-limiting examples of olefin copolymers include copolymers derived from ethylene and a monoene having 3 or more carbon atoms. Non-limiting examples of the monoene having 3 or more carbon atoms include propene; butenes (e.g., 1-butene, 2-butene and isobutene) and alkyl substituted butenes; pentenes (e.g., 1-pentene and 2-pentene) and alkyl substituted pentenes (e.g., 4-methyl-1-pentene); hexenes (e.g., 1-hexene, 2-hexene and 3-hexene) and alkyl substituted hexenes; heptenes (e.g., 1-heptene, 2-heptene and 3-heptene) and alkyl substituted heptenes; octenes (e.g., 1-octene, 2-octene, 3-octene and 4-octene) and alkyl substituted octenes; nonenes (e.g., 1-nonene, 2 nonene, 3-nonene and 4-nonene) and alkyl substituted nonenes; decenes (e.g., 1-decene, 2-decene, 3-decene, 4-decene and 5-decene) and alkyl substituted decenes; dodecenes and alkyl substituted dodecenes; and butadiene. In some embodiments, the olefin copolymer is an ethylene/alpha-olefin (EAO) copolymer or ethylene/propylene copolymer (EPM). In some embodiments, the olefin copolymer is an ethylene/octene copolymer.

In other embodiments, the olefin copolymer is derived from (i) a $C_{3-20}$ olefin substituted with an alkyl or aryl group (e.g., 4-methyl-1-pentene and styrene) and (ii) a diene (e.g. butadiene, 1,5-hexadiene, 1,7-octadiene and 1,9-decadiene). A non-limiting example of such olefin copolymer includes styrene-butadiene-styrene (SBS) block copolymer.

In other embodiments, one of the at least two polyolefins is an olefin terpolymer. The olefin terpolymer can be derived from three different olefins. The amount of the olefin terpolymer in the polymer blend can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend.

Any olefin terpolymer known to a person of ordinary skill in the art may be used in the polymer blends disclosed herein. Non-limiting examples of olefin terpolymers include terpolymers derived from (i) ethylene, (ii) a monoene having 3 or more carbon atoms, and (iii) a diene. In some embodiments, the olefin terpolymer is an ethylene/alpha-olefin/diene terpolymers (EAODM) and ethylene/propylene/diene terpolymer (EPDM).

In other embodiments, the olefin terpolymer is derived from (i) two different monoenes, and (ii) a $C_{3-20}$ olefin substituted with an alkyl or aryl group. A non-limiting example of such olefin terpolymer includes styrene-ethylene-co-(butene)-styrene (SEBS) block copolymer.

In other embodiments, one of the at least two polyolefins can be any vulcanizable elastomer or rubber which is derived from at least an olefin, provided that the vulcanizable elastomer can be cross-linked (i.e., vulcanized) by a cross-linking agent. The vulcanizable elastomer and a thermoplastic such as polypropylene together can form a TPV after cross-linking. Vulcanizable elastomers, although generally thermoplastic in the uncured state, are normally classified as thermosets because they undergo an irreversible process of thermosetting to an unprocessable state. Preferably, the vulcanized elastomer is dispersed in a matrix of the thermoplastic polymer as domains. The average domain size may range from about 0.1 micron to about 100 micron, from about 1 micron to about 50 microns; from about 1 micron to about 25 microns; from about 1 micron to about 10 microns, or from about 1 micron to about 5 microns.

Non-limiting examples of suitable vulcanizable elastomers or rubbers include ethylene/higher alpha-olefin/polyene terpolymer rubbers such as EPDM. Any such terpolymer rubber which can be completely cured (cross-linked) with a phenolic curative or other cross-linking agent is satisfactory. In some embodiments, the terpolymer rubbers can be essentially non-crystalline, rubbery terpolymer of two or more alpha-olefins, preferably copolymerized with at least one polyene (i.e, an alkene comprises two or more carbon-carbon double bonds), usually a non-conjugated diene. Suitable terpolymer rubbers comprise the products from the polymerization of monomers comprising two olefins having only one double bond, generally ethylene and propylene, and a lesser quantity of non-conjugated diene. The amount of non-conjugated diene is usually from about 2 to about 10 weight percent of the rubber. Any terpolymer rubber which has sufficient reactivity with phenolic curative to completely cure is suitable. The reactivity of terpolymer rubber varies depending upon both the amount of unsaturation and the type of unsaturation present in the polymer. For example, terpolymer rubbers derived from ethylidene norbornene are more reactive toward phenolic curatives than terpolymer rubbers derived from dicyclopentadiene and terpolymer rubbers derived from 1,4-hexadiene are less reactive toward phenolic curatives than terpolymer rubbers derived from dicyclopentadiene. However, the differences in reactivity can be overcome by polymerizing larger quantities of less active diene into the rubber molecule. For example, 2.5 weight percent of ethylidene norbornene or dicyclopentadiene may be sufficient to impart sufficient reactivity to the terpolymer to make it completely curable with phenolic curative comprising conventional cure activators, whereas, at least 3.0 weight percent or more is required to obtain sufficient reactivity in an terpolymer rubber derived from 1,4-hexadiene. Grades of terpolymer rubbers such as EPDM rubbers suitable for embodiments of the invention are commercially available. Some of the EPDM rubbers are disclosed in Rubber World Blue Book 1975 Edition, Materials and Compounding Ingredients for Rubber, pages 406-410.

Generally, an terpolymer elastomer has an ethylene content of from about 10% to about 90% by weight, a higher alpha-olefin content of about 10% to about 80% by weight, and a polyene content of about 0.5% to about 20% by weight, all weights based on the total weight of the polymer. The higher alpha-olefin contains from about 3 to about 14 carbon atoms. Examples of these are propylene, isobutylene, 1-butene, 1-pentene, 1-hexene, 1-octene, 2-ethyl-1-hexene, 1-dodecene, and the like. The polyene can be a conjugated diene such as isoprene, butadiene, chloroprene, and the like; a nonconjugated diene; a triene, or a higher enumerated polyene. Examples of trienes are 1,4,9-decatriene, 5,8-dimethyl-1,4,9-decatriene, 4,9-dimethyl-1,4,9-decatriene, and the like. The nonconjugated dienes are more preferred. The nonconjugated dienes contain from 5 to about 25 carbon atoms. Examples are nonconjugated diolefins such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclo nondienes such as 3-methyl-bicyclo (4,2,1) nona-3,7-diene, 3-ethylbicyclonondiene, and the like; indenes such as methyl tetrahydroindene and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and the like; and tricyclo dienes such as 3-methyl-tricyclo-(5,2,1,0$^2$,6)-3,8-decadiene and the like.

In some embodiments, the terpolymer rubbers contain from about 20% to about 80% by weight of ethylene, about 19% to about 70% by weight of a higher alpha-olefin, and about 1% to about 10% by weight of a nonconjugated diene. The more preferred higher alpha-olefins are propylene and 1-butene. The more preferred polyenes are ethylidene norbornene, 1,4-hexadiene, and dicyclopentadiene.

In other embodiments, the terpolymer rubbers have an ethylene content of from about 50% to about 70% by weight, a propylene content of from about 20% to about 49% by weight, and a nonconjugated diene content from about 1% to about 10% by weight, all weights based upon the total weight of the polymer.

Some non-limiting examples of terpolymer rubbers for use include NORDEL® IP 4770R, NORDEL®13722 IP available from DuPont Dow Elastomers, Wilmington, Del. and KELTAN® 5636A available from DSM Elastomers Americas, Addis, La.

Additional suitable elastomers are disclosed in the following U.S. Pat. Nos. 4,130,535; 4,111,897; 4,311,628; 4,594,390; 4,645,793; 4,808,643; 4,894,408; 5,936,038, 5,985,970; and 6,277,916, all of which are incorporated by reference herein in their entirety.

Additives

Optionally, the polymer blends disclosed herein can comprise at least one additive for the purposes of improving and/or controlling the processability, appearance, physical, chemical, and/or mechanical properties of the polymer blends. In some embodiments, the polymer blends do not comprise an additive. Any plastics additive known to a person of ordinary skill in the art may be used in the polymer blends disclosed herein. Non-limiting examples of suitable additives include slip agents, anti-blocking agents, plasticizers, antioxidants, UV stabilizers, colorants or pigments, fillers, lubricants, antifogging agents, flow aids, coupling agents, crosslinking agents, nucleating agents, surfactants, solvents, flame retardants, antistatic agents, and combinations thereof. The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the polymer blend. Some polymer additives have been described in Zweifel Hans et al., "*Plastics Additives Handbook*," Hanser Gardner Publications, Cincinnati, Ohio, 5th edition (2001), which is incorporated herein by reference in its entirety.

In some embodiments, the polymer blends disclosed herein comprise a slip agent. In other embodiments, the polymer blends disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polymer blends disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof. In a particular embodiment, the slip agent for the polymer blends disclosed herein is an amide represented by Formula (I) below:

wherein each of $R^1$ and $R^2$ is independently H, alkyl, cycloalkyl, alkenyl, cycloalkenyl or aryl; and $R^3$ is alkyl or alkenyl, each having about 11 to about 39 carbon atoms, about 13 to about 37 carbon atoms, about 15 to about 35 carbon atoms, about 17 to about 33 carbon atoms or about 19 to about 33 carbon atoms. In some embodiments, $R^3$ is alkyl or alkenyl, each having at least 19 to about 39 carbon atoms. In other embodiments, $R^3$ is pentadecyl, heptadecyl, nonadecyl, heneicosanyl, tricosanyl, pentacosanyl, heptacosanyl, nonacosanyl, hentriacontanyl, tritriacontanyl, nonatriacontanyl or a combination thereof. In further embodiments, $R^3$ is pentadecenyl, heptadecenyl, nonadecenyl, heneicosanenyl, tricosanenyl, pentacosanenyl, heptacosanenyl, nonacosanenyl, hentriacontanenyl, tritriacontanenyl, nonatriacontanenyl or a combination thereof.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylene-bis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium;

ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer blend can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer blend. Some slip agents have been described in Zweifel Hans et al., "*Plastics Additives Handbook*," Hanser Gardner Publications, Cincinnati, Ohio, 5th edition, Chapter 8, pages 601-608 (2001), which is incorporated herein by reference.

Optionally, the polymer blends disclosed herein can comprise an anti-blocking agent. In some embodiments, the polymer blends disclosed herein do not comprise an anti-blocking agent. The anti-blocking agent can be used to prevent the undesirable adhesion between touching layers of articles made from the polymer blends, particularly under moderate pressure and heat during storage, manufacture or use. Any anti-blocking agent known to a person of ordinary skill in the art may be added to the polymer blends disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer blend can be from about greater than 0 to about 3 wt %, from about 0.0001 to about 2 wt %, from about 0.001 to about 1 wt %, or from about 0.001 to about 0.5 wt % of the total weight of the polymer blend. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Optionally, the polymer blends disclosed herein can comprise a plasticizer. In general, a plasticizer is a chemical that can increase the flexibility and lower the glass transition temperature of polymers. Any plasticizer known to a person of ordinary skill in the art may be added to the polymer blends disclosed herein. Non-limiting examples of plasticizers include abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the polymer blend can be from greater than 0 to about 15 wt %, from about 0.5 to about 10 wt %, or from about 1 to about 5 wt % of the total weight of the polymer blend. Some plasticizers have been described in George Wypych, "*Handbook of Plasticizers*," ChemTec Publishing, Toronto-Scarborough, Ontario (2004), which is incorporated herein by reference.

In some embodiments, the polymer blends disclosed herein optionally comprise an antioxidant that can prevent the oxidation of polymer components and organic additives in the polymer blends. Any antioxidant known to a person of ordinary skill in the art may be added to the polymer blends disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer blend can be from about greater than 0 to about 5 wt %, from about 0.0001 to about 2.5 wt %, from about 0.001 to about 1 wt %, or from about 0.001 to about 0.5 wt % of the total weight of the polymer blend. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the polymer blends disclosed herein optionally comprise an UV stabilizer that may prevent or reduce the degradation of the polymer blends by UV radiations. Any UV stabilizer known to a person of ordinary skill in the art may be added to the polymer blends disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer blend can be from about greater than 0 to about 5 wt %, from about 0.01 to about 3 wt %, from about 0.1 to about 2 wt %, or from about 0.1 to about 1 wt % of the total weight of the polymer blend. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, the polymer blends disclosed herein optionally comprise a colorant or pigment that can change the look of the polymer blends to human eyes. Any colorant or pigment known to a person of ordinary skill in the art may be added to the polymer blends disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer blend can be from about greater than 0 to about 10 wt %, from about 0.1 to about 5 wt %, or from about 0.25 to about 2 wt % of the total weight of the polymer blend. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polymer blends disclosed herein can comprise a filler which can be used to adjust, inter alia, volume, weight, costs, and/or technical performance. Any filler known to a person of ordinary skill in the art may be added to the polymer blends disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer blend can be from about greater than 0 to about 80 wt %, from about 0.1 to about 60 wt %, from about 0.5 to about 40 wt %, from about 1 to about 30 wt %, or from about 10 to about 40 wt % of the total weight of the polymer blend. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the polymer blends disclosed herein can comprise a lubricant. In general, the lubricant can be used, inter alia, to modify the rheology of the molten polymer blends, to improve the surface finish of molded articles, and/or to facilitate the dispersion of fillers or pigments. Any lubricant known to a person of ordinary skill in the art may be added to the polymer blends disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer blend can be from about greater than 0 to about 5 wt %, from about 0.1 to about 4 wt %, or from about 0.1 to about 3 wt % of the total weight of the polymer blend. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer blends disclosed herein can comprise an antistatic agent. Generally, the antistatic agent can increase the conductivity of the polymer blends and to prevent static charge accumulation. Any antistatic agent known to a person of ordinary skill in the art may be added to the polymer blends disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer blend can be from about greater than 0 to about 5 wt %, from about 0.01 to about 3 wt %, or from about 0.1 to about 2 wt % of the total weight of the polymer blend. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In further embodiments, the polymer blends disclosed herein optionally comprise a cross-linking agent that can be used to increase the cross-linking density of the polymer blends. Any cross-linking agent known to a person of ordinary skill in the art may be added to the polymer blends disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris (2-methoxyethoxy)silane, vinyltriacetoxysilane, vinylmethyldimethoxysilane, and 3-methacryloyloxypropyltrimethoxysilane). Where used, the amount of the cross-linking agent in the polymer blend can be from about greater than 0 to about 20 wt %, from about 0.1 to about 15 wt %, or from about 1 to about 10 wt % of the total weight of the polymer blend. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

The cross-linking of the polymer blends can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Preparation of the Polymer Blends

The ingredients of the polymer blends, i.e., the ethylene/α-olefin interpolymer, the polyolefins (i.e., the first polyolefin and the second polyolefin) and the optional additives, can be mixed or blended using methods known to a person of ordinary skill in the art, preferably methods that can provide a substantially homogeneous distribution of the polyolefin and/or the additives in the ethylene/α-olefin interpolymer. Non-limiting examples of suitable blending methods include melt blending, solvent blending, extruding, and the like.

In some embodiments, the ingredients of the polymer blends are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer blend is formed by heating the contents of the vessel to a molten state while stirring.

In other embodiments, the ingredients of the polymer blends are processed using solvent blending. First, the ingredients of the desired polymer blend are dissolved in a suitable solvent and the mixture is then mixed or blended. Next, the solvent is removed to provide the polymer blend.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer blend. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polymer blends, the desired amounts of the additives can be added in one charge or multiple charges to the ethylene/α-olefin interpolymer, the polyolefins or the polymer blend. Furthermore, the addition can take place in any order. In some embodiments, the additives are first added and mixed or blended with the ethylene/α-olefin interpolymer and then the additive-containing interpolymer is blended with the polyolefins. In other embodiments, the additives are first added and mixed or blended with the polyolefins and then with the ethylene/α-olefin interpolymer. In further embodiments, the ethylene/α-olefin interpolymer is blended with the polyolefins first and then the additives are blended with the polymer blend.

Alternatively, master batches containing high concentrations of the additives can be used. In general, master batches can be prepared by blending either the ethylene/α-olefin interpolymer, one of the polyolefins or the polymer blend with high concentrations of additives. The master batches can have additive concentrations from about 1 to about 50 wt %, from about 1 to about 40 wt %, from about 1 to about 30 wt %, or from about 1 to about 20 wt % of the total weight of the polymer blend. The master batches can then be added to the polymer blends in an amount determined to provide the desired additive concentrations in the end products. In some embodiments, the master batch contains a slip agent, an anti-blocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a slip agent, an anti-blocking agent or a combination thereof. In other embodiment, the master batch contains a slip agent.

In some embodiments, the first polyolefin and the second polyolefin together constitute a thermoplastic vulcanizate where the first polyolefin is a thermoplastic such as polypropylene and the second polyolefin is a curable vulcanizable rubber such as EPDM. The thermoplastic vulcanizates are typically prepared by blending the thermoplastic and curable vulcanizable rubber by dynamic vulcanization. The compositions can be prepared by any suitable method for mixing of rubbery polymers including mixing on a rubber mill or in internal mixers such as a Banbury mixer. In the compounding procedure, one or more additives as described above can be incorporated. Generally, it is preferred to add the cross-linking or curing agents in a second stage of compounding which may be on a rubber mill or in an internal mixer operated at a temperature normally not in excess of about 60° C.

Dynamic vulcanization is a process whereby a blend of thermoplastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during the vulcanization step. One advantage of dynamic vulcanization is that elastoplastic (thermoplastic elastomeric) compositions may be obtained when the blend contains the proper proportions of plastic and rubber. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,04; 4,287,324; 4,288,570; 4,299,931; 4,311,628 and 4,338,413, all of which are incorporated herein by reference in their entirety.

Any mixer capable of generating a shear rate of 2000 $sec^{-1}$ or higher is suitable for carrying out the process. Generally, this requires a high speed internal mixer having a narrow clearance between the tips of the kneading elements and the wall. Shear rate is the velocity gradient in the space between the tip and the wall. Depending upon the clearance between the tip and the wall, rotation of the kneading elements from about 100 to about 500 revolutions per minute (rpm) is generally adequate to develop a sufficient shear rate. Depending upon the number of tips on a given kneading element and the rate of rotation, the number of times the composition is kneaded by each element is from about 1 to about 30 times per second, preferably from about 5 to about 30 times per second, and more preferably from about 10 to about 30 times per second. This means that material typically is kneaded from about 200 to about 1800 times during vulcanization. For example, in a typical process with a rotor with three tips rotating at about 400 rpm in a mixer having a residence time of about 30 seconds, the material is kneaded about 600 times.

A mixer satisfactory for carrying out the process is a high shear mixing extruder produced by Werner & Pfleiderer, Germany. The Werner & Pfleiderer (W&P) extruder is a twin-shaft screw extruder in which two intermeshing screws rotate in the same direction. Details of such extruders are described in U.S. Pat. Nos. 3,963,679 and 4,250,292; and German Pat. Nos. 2,302,546; 2,473,764 and 2,549,372, the disclosures of which are incorporated herein by reference. Screw diameters vary from about 53 mm to about 300 mm; barrel lengths vary but generally the maximum barrel length is the length necessary to maintain a length over diameter ratio of about 42. The shaft screws of these extruders normally are made-up of alternating series of conveying sections and kneading sections. The conveying sections cause material to move forward from each kneading section of the extruder. Typically there are about an equal number of conveying and kneading sections fairly evenly distributed along the length of the barrel. Kneading elements containing one, two, three or four tips are suitable, however, kneading elements from about 5 to about 30 mm wide having three tips are preferred. At recommended screw speeds of from about 100 to about 600 rpm and radial clearance of from about 0.1 to about 0.4 mm, these mixing extruders provide shear rates of at least from about 2000 $sec^{-1}$ to about 7500 $sec^{-1}$ or more. The net mixing power expended in the process including homogenization and dynamic vulcanization is usually from about 100 to about 500 watt hours per kilogram of product produced; with from about 300 to about 400 watt hours per kilogram being typical.

The process is illustrated by the use of W&P twin screw extruders, models ZSK-53 or ZSK-83. Unless specified otherwise, all of the plastic, rubber and other compounding ingredients except the cure activator are fed into the entry port of the extruder. In the first third of the extruder, the composition is masticated to melt the plastic and to form an essentially homogeneous blend. The cure activator (vulcanization accelerator) is added through another entry port located about one-third of the length of the barrel downstream from the initial entry port. The last two-thirds of the extruder (from the cure activator entry port to the outlet of the extruder) is regarded as the dynamic vulcanization zone. A vent operated under reduced pressure is located near the outlet to remove any volatile by-products. Sometimes, additional extender oil or plasticizer and colorants are added at another entry port located about the middle of the vulcanization zone.

The residence time within the vulcanization zone is the time a given quantity of material is within the aforesaid vulcanization zone. Since the extruders are typically operated under a starved condition, usually from about 60 to about 80 percent full, residence time is essentially directly proportional to feed rate. Thus, residence time in the vulcanization zone is calculated by multiplying the total volume of the dynamic vulcanization zone times the fill factor divided by the volume flow rate. Shear rate is calculated by dividing the product of the circumference of the circle generated by the screw tip times the revolutions of the screw per second by the tip clearance. In other words, shear rate is the tip velocity divided by the tip clearance.

Methods other than the dynamic curing of rubber/thermoplastic polymer resin blends can be utilized to prepare compositions. For example, the rubber can be fully cured in the absence of the thermoplastic polymer resin, either dynamically or statically, powdered, and mixed with the thermoplastic polymer resin at a temperature above the melting or softening point of the resin. If the cross-linked rubber particles are small, well dispersed and in an appropriate concentration, the compositions are easily obtained by blending cross-linked rubber and thermoplastic polymer resin. It is preferred that a mixture comprising well dispersed small particles of cross-linked rubber is obtained. A mixture which contains poor dispersed or too large rubber particles can be comminuted by cold milling, to reduce particle size to below about 50μ, preferably below about 20μ and more preferably to below about 5μ. After sufficient comminution or pulverization, a TPV composition is obtained. Frequently, poor dispersion or too large rubber particles is obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

Applications of the Polymer Blends

The polymer blends disclosed herein are useful for making a variety of articles such as tires, hoses, belts, gaskets, shoe soles, moldings and molded parts. They are particularly useful for applications that require high melt strength such as large part blow molding, foams, and wire cables. Additional applications are disclosed in the following U.S. Pat. Nos. 6,329,463; 6,288,171; 6,277,916; 6,270,896; 6,221,451; 6,174,962; 6,169,145; 6,150,464; 6,147,160; 6,100,334; 6,084,031; 6,069,202; 6,066,697; 6,028,137; 6,020,427; 5,977,271; 5,960,977; 5,957,164; 5,952,425; 5,939,464; 5,936,038; 5,869,591; 5,750,625; 5,744,238; 5,621,045; and 4,783,579, all of which are incorporated herein by reference in their entirety.

The polymer blends can be used to prepare various useful articles with known polymer processes such as extrusion (e.g., sheet extrusion and profile extrusion), injection molding, molding, rotational molding, and blow molding. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 mil/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)):
$M_{polyethylene} = 0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instronm instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or 110 is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a. Preparation of (1-methylethyl)(2-hydroxy-3,5-di(t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene)(1-(N-(1-methylethyl)immino)methyl (2-oxoyl) Zirconium Dibenzyl A solution of (1-methylethyl)(2-hydroxy-3,5-di(t-butyl)phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a. Preparation of (1-(2-methylcyclohexyl ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl)(2-oxoyl-3,5-di(t-butyl)phenyl)immino)Zirconium Dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide) (SA18), ethylzinc (2,6-diphenylphenoxide) (SA19), and ethylzinc (t-butoxide) (SA20).

Examples 1-4

Comparative Examples A*-C*

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 µL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A* shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for Comparative Example B* shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

TABLE 1

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution

Examples 5-19

Comparative Examples D*-F*, Continuous Solution Polymerization, Catalyst A1/B2+DEZ Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | " | 9.5 | 5.00 | " | — | — | 109 | 0.10 | 0.19 | " | 1743 | 0.40 | 485 | 1.47 | 89.9 | 11.3 | 126.8 |
| F* | " | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1] standard $cm^3$/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | $T_m - T_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |

TABLE 3-continued

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | Tm − $T_{CRYSTAF}$ (° C.) | CRYSTAF Peak Area (percent) |
|---|---|---|---|---|---|---|---|---|---|---|---|---|---|
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative Example G* is a substantially linear ethylene/1-octene copolymer (AFFINITY®, available from The Dow Chemical Company), Comparative Example H* is an elastomeric, substantially linear ethylene/1-octene copolymer (AFFINITY®EG8100, available from The Dow Chemical Company), Comparative Example I* is a substantially linear ethylene/1-octene copolymer (AFFINITY®PL1840, available from The Dow Chemical Company), Comparative Example J* is a hydrogenated styrene/butadiene/styrene triblock copolymer (KRATON™ G1652, available from KRATON Polymers), Comparative Example K* is a thermoplastic vulcanizate (TPV, a polyolefin blend containing dispersed therein a crosslinked elastomer). Results are presented in Table 4.

temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative Example F*) has a storage modulus ratio of 9 and a random ethylene/octene copolymer (Comparative Example G*) of similar density has a storage modulus ratio an order of magnitude greater (89). It is desirable that the storage modulus ratio of a polymer be as close to 1 as possible. Such polymers will be relatively unaffected by temperature, and fabricated articles comprising such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa,

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative Example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative Example J* (a commercial SEBS) has a good 1 mm TMA temperature of about 107° C., but it has very poor (high temperature 70° C.) compression set of about 100 percent and it also failed to recover (sample broke) during a high meaning it is free flowing under the conditions tested, compared to Comparative Examples F* and G* which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative Examples F*, G*, H* and J* all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |

TABLE 6-continued

Polymer Optical Properties

| Ex. | Internal Haze (percent) | Clarity (percent) | 45° Gloss (percent) |
|---|---|---|---|
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative Example E* are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19A-F, Continuous Solution Polymerization, Catalyst A1/B2+DEZ Continuous solution polymerizations are carried out in a computer controlled well-mixed reactor. Purified mixed alkanes solvent (Isopar™ E available from ExxonMobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Process details and results are contained in Table 8A. Selected polymer properties are provided in Table 8B and 8C.

TABLE 8A

Polymerization Conditions for Polymers 19a-j

| Cat A1[2] | Cat A1 | Cat B2[3] | Cat B2 | DEZ | DEZ |

TABLE 8A-continued

Polymerization Conditions for Polymers 19a-j

| Ex. | $C_2H_4$ lb/hr | $C_8H_{16}$ lb/hr | Solv. lb/hr | $H_2$ sccm[1] | T °C. | Conc. ppm | Flow lb/hr | Conc. ppm | Flow lb/hr | Conc wt % | Flow lb/hr |
|---|---|---|---|---|---|---|---|---|---|---|---|
| 19a | 55.29 | 32.03 | 323.03 | 101 | 120 | 600 | 0.25 | 200 | 0.42 | 3.0 | 0.70 |
| 19b | 53.95 | 28.96 | 325.3 | 577 | 120 | 600 | 0.25 | 200 | 0.55 | 3.0 | 0.24 |
| 19c | 55.53 | 30.97 | 324.37 | 550 | 120 | 600 | 0.216 | 200 | 0.609 | 3.0 | 0.69 |
| 19d | 54.83 | 30.58 | 326.33 | 60 | 120 | 600 | 0.22 | 200 | 0.63 | 3.0 | 1.39 |
| 19e | 54.95 | 31.73 | 326.75 | 251 | 120 | 600 | 0.21 | 200 | 0.61 | 3.0 | 1.04 |
| 19f | 50.43 | 34.80 | 330.33 | 124 | 120 | 600 | 0.20 | 200 | 0.60 | 3.0 | 0.74 |
| 19g | 50.25 | 33.08 | 325.61 | 188 | 120 | 600 | 0.19 | 200 | 0.59 | 3.0 | 0.54 |
| 19h | 50.15 | 34.87 | 318.17 | 58 | 120 | 600 | 0.21 | 200 | 0.66 | 3.0 | 0.70 |
| 19i | 55.02 | 34.02 | 323.59 | 53 | 120 | 600 | 0.44 | 200 | 0.74 | 3.0 | 1.72 |
| 19j | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | [Zn][4] in polymer ppm | Poly Rate[5] lb/hr | Conv[6] wt % | Polymer wt % | Eff.[7] |
|---|---|---|---|---|---|---|---|---|---|
| 19a | 4500 | 0.65 | 525 | 0.33 | 248 | 83.94 | 88.0 | 17.28 | 297 |
| 19b | 4500 | 0.63 | 525 | 0.11 | 90 | 80.72 | 88.1 | 17.2 | 295 |
| 19c | 4500 | 0.61 | 525 | 0.33 | 246 | 84.13 | 88.9 | 17.16 | 293 |
| 19d | 4500 | 0.66 | 525 | 0.66 | 491 | 82.56 | 88.1 | 17.07 | 280 |
| 19e | 4500 | 0.64 | 525 | 0.49 | 368 | 84.11 | 88.4 | 17.43 | 288 |
| 19f | 4500 | 0.52 | 525 | 0.35 | 257 | 85.31 | 87.5 | 17.09 | 319 |
| 19g | 4500 | 0.51 | 525 | 0.16 | 194 | 83.72 | 87.5 | 17.34 | 333 |
| 19h | 4500 | 0.52 | 525 | 0.70 | 259 | 83.21 | 88.0 | 17.46 | 312 |
| 19i | 4500 | 0.70 | 525 | 1.65 | 600 | 86.63 | 88.0 | 17.6 | 275 |
| 19j | — | — | — | — | — | — | — | — | — |

[1] standard cm$^3$/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 8B

Polymer Physical properties

| Polymer Ex. No. | Density (g/cc) | I2 | I10 | I10/I2 | Mw (g/mol) | Mn (g/mol) | Mw/Mn | Heat of Fusion (J/g) | Tm (°C.) | Tc (°C.) | TCRYSTAF (°C.) | Tm-TCRYSTAF (°C.) | CRYSTAF Peak Area (wt %) |
|---|---|---|---|---|---|---|---|---|---|---|---|---|---|
| 19g | 0.8649 | 0.9 | 6.4 | 7.1 | 135000 | 64800 | 2.1 | 26 | 120 | 92 | 30 | 90 | 90 |
| 19h | 0.8654 | 1.0 | 7.0 | 7.1 | 131600 | 66900 | 2.0 | 26 | 118 | 88 | — | — | — |

TABLE 8C

Average Block Index For exemplary polymers[1]

| Example | Zn/C2[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the measurement and calculation of the block indices for various polymers is disclosed in U.S. patent application Ser. No. __ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2] Zn/C2 * 1000 = (Zn feed flow * Zn concentration/1000000/Mw of Zn)/(Total Ethylene feed flow * (1-fractional ethylene conversion rate)/Mw of Ethylene) * 1000. Please note that "Zn" in "Zn/C2 * 1000" refers to the amount of zinc in diethyl zinc ("DEZ") used in the polymerization process, and "C2" refers to the amount of ethylene used in the polymerization process.

Procedure for Making Polymer Example 20

The procedure for making Polymer Example 20 used in the following examples is as follows: A single one gallon autoclave continuously stirred tank reactor (CSTR) was employed for the experiments. The reactor runs liquid full at ca. 540 psig with process flow in the bottom and out the top. The reactor is oil jacketed to help remove some of the heat of reaction. Primary temperature control is achieved by two heat exchangers on the solvent/ethylene addition line. ISOPAR® E, hydrogen, ethylene, and 1-octene were supplied to the reactor at controlled feed rates.

Catalyst components were diluted in an air-free glove box. The two catalysts were fed individually at the desired ratio from different holding tanks. To avoid catalyst feed line plugging, the catalyst and cocatalyst lines were split and fed separately into the reactor. The cocatalyst was mixed with the diethylzinc chain shuttling agent before entry into the reactor.

The prime product was collected under stable reactor conditions. After several hour, the product samples showed no substantial change in melt index or density. The products were stabilized with a mixture of IRGANOX®1010, IRGANOX® 1076 and IRGAFOS®176.

| Density | $I_2$ | $I_{10}/I_2$ | Temperature (° C.) | $C_2$ flow (kg/hr) | $C_8$ flow (kg/hr) | $H_2$ flow (sccm) |
|---|---|---|---|---|---|---|
| 0.8540 | 1.05 | 37.90 | 120.0 | 0.600 | 5.374 | 0.9 |

| $C_2$ conversion (%) | $C_8$ conversion (%) | % solids | Polymer production rate (kg/hr) | Catalyst Efficiency (kg polymer/g total metal) | A1 Catalyst Flow (kg/hr) | A1 Catalyst Concentration (ppm) |
|---|---|---|---|---|---|---|
| 89.9 | 20.263 | 10.0 | 1.63 | 287 | 0.043 | 88.099 |

| A2 Catalyst Flow (kg/hr) | A2 Catalyst Concentration (ppm) | Mole % A2 | RIBS-2 Flow (kg/hr) | RIBS-2 Concentration (ppm) | DEZ flow (kg/hr) | DEZ concentration (ppm Zn) |
|---|---|---|---|---|---|---|
| 0.196 | 9.819 | 50.039 | 0.063 | 1417 | 0.159 | 348 |

The structures for the two catalysts used in the above procedures (i.e., Catalysts A1 and A2) are shown below:

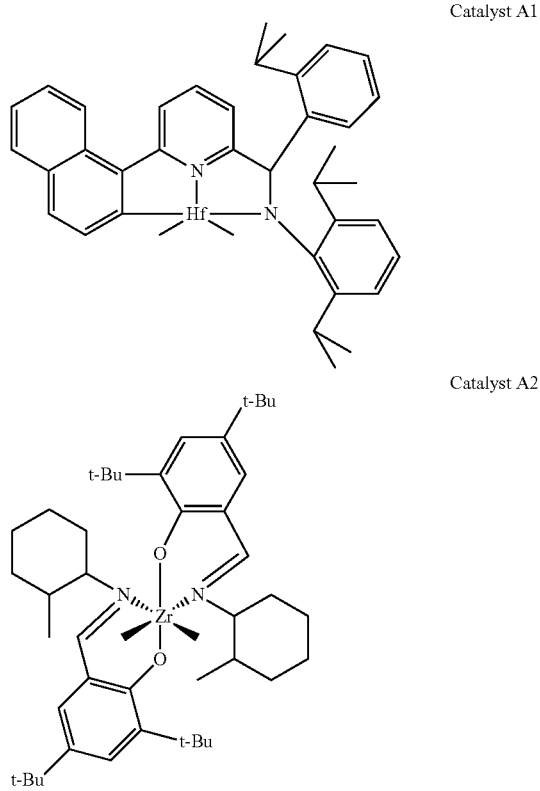

Catalyst A1

Catalyst A2

Blend Examples

Blend compositions comprising Polymer Example 20, a random ethylene/1-octene copolymer and polypropylene (PP1) were prepared, evaluated and tested for properties. The following polymers were compared in blend compositions.

Polymer Example 20 is an ethylene/1-octene block copolymer having a composite 1-octene content of 77 wt. %, a composite density of 0.854 g/cc, a DSC peak melting point of 105° C., a hard segment level based upon DSC measurement of 6.8 wt. %, an ATREF crystallization temperature of 73° C., a number average molecular weight of 188,254 daltons, a weight average molecular weight of 329,600 daltons, a melt index at 190° C., 2.16 Kg of 1.0 dg/min and a melt index at 190° C., 10 Kg of 37.0 dg/min. The polymer of Example 20 is prepared as described above.

Comparative Example $A^1$ is a random ethylene/1-octene copolymer having a density of 0.87 g/cc, a 1-octene content of 38 wt. %, a peak melting point of 59.7° C., a number average molecular weight of 59,000 daltons, a weight average molecular weight of 121,300 daltons, a melt index of 1.0 dg/min at 190° C., 2.16 Kg and a melt index at 190° C., 10 Kg of 7.5 dg/min. The product is commercially available under the tradename Engage® 8100 from The Dow Chemical Company.

The above polymers were melt mixed with PP1, a polypropylene homopolymer having a melt flow index at 230° C., 2.16 Kg of 2.0 dg/min, a DSC melting point of 161° C., and a density of 0.9 g/cc. The product is commercially available The Dow Chemical Company under the commercial name of Dow Polypropylene H110-02N. For all blends, 0.2 parts per 100 total polymer of a 1:1 blend of phenolic/phosphite antioxidant, available under the tradename Irganox® B215, was added for heat stability. This additive is designated as AO in Table 9.

The following mixing procedure was used. A 69 cc capacity Haake batch mixing bowl fitted with roller blades was heated to 200° C. for all zones. The mixing bowl rotor speed was set at 30 rpm and was charged with PP1, allowed to flux for one minute, then charged with AO and fluxed for an additional two minutes. The mixing bowl was then charged with either polymer Example 20, Comparative Example $A^1$, or a 1:1 blend of polymer Example 20 and Comparative Example $A^1$. After adding the elastomer, the mixing bowl rotor speed was increased to 60 rpm and allowed to mix for an additional 3 minutes. The mixture was then removed from the mixing bowl and pressed between Mylar sheets sandwiched between metal platens and compressed in a Carver compression molding machine set to cool at 15° C. with a pressure of 20 kpsi. The cooled mixture was then compression molded into 2 inch×2 inch×0.06 inch plaques via compression molding for 3 minutes at 190° C., 2 kpsi pressure for 3 minutes, 190° C., 20 kpsi pressure for 3 minutes, then cooling at 15° C., 20 kpsi for 3 minutes. The mixtures prepared under the procedure described above are listed in Table 9.

TABLE 9

| Comparative Blends with PP Ingredient | Mixture 1 Parts | Mixture 2 parts | Mixture 3 parts |
|---|---|---|---|
| PP1 | 70 | 70 | 70 |
| Polymer Example 20 | 30 | 0 | 15 |
| Comparative Example A[1] | 0 | 30 | 15 |
| AO | 0.2 | 0.2 | 0.2 |

Compression molded plaques were trimmed so that sections could be collected at the core. The trimmed plaques were cryopolished prior to staining by removing sections from the blocks at −60° C. to prevent smearing of the elastomer phases. The cryo-polished blocks were stained with the vapor phase of a 2% aqueous ruthenium tetraoxide solution for 3 hours at ambient temperature. The staining solution was prepared by weighing 0.2 gm of ruthenium (III) chloride hydrate ($RuCl_3xH_2O$) into a glass bottle with a screw lid and adding 10 ml of 5.25% aqueous sodium hypochlorite to the jar. The samples were placed in the glass jar using a glass slide having double sided tape. The slide was placed in the bottle in order to suspend the blocks about 1 inch above the staining solution. Sections of approximately 100 nanometers in thickness were collected at ambient temperature using a diamond knife on a Leica EM UC6 microtome and placed on 400 mesh virgin TEM grids for observation.

Bright-field images were collected on a JEOL JEM 1230 Transmission Electron Microscope operated at 100 kV accelerating voltage and collected using Gatan 791 and Gatan 794 digital cameras. The images were post processed using Adobe Photoshop 7.0.

Figure 8:
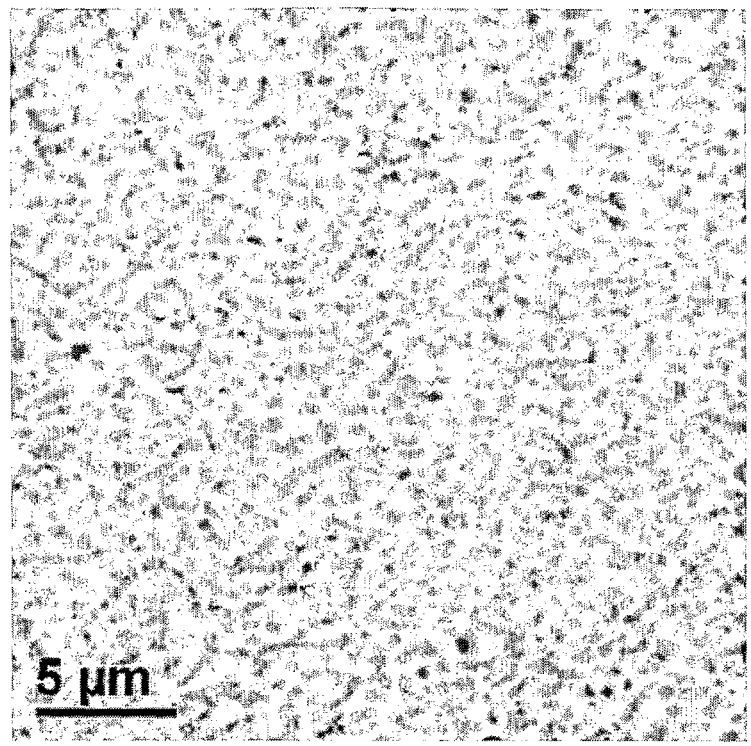
FIG. 8 is a transmission electron micrograph of a mixture of polypropylene and an ethylene/octene block copolymer of Example 20.
Figure 9:
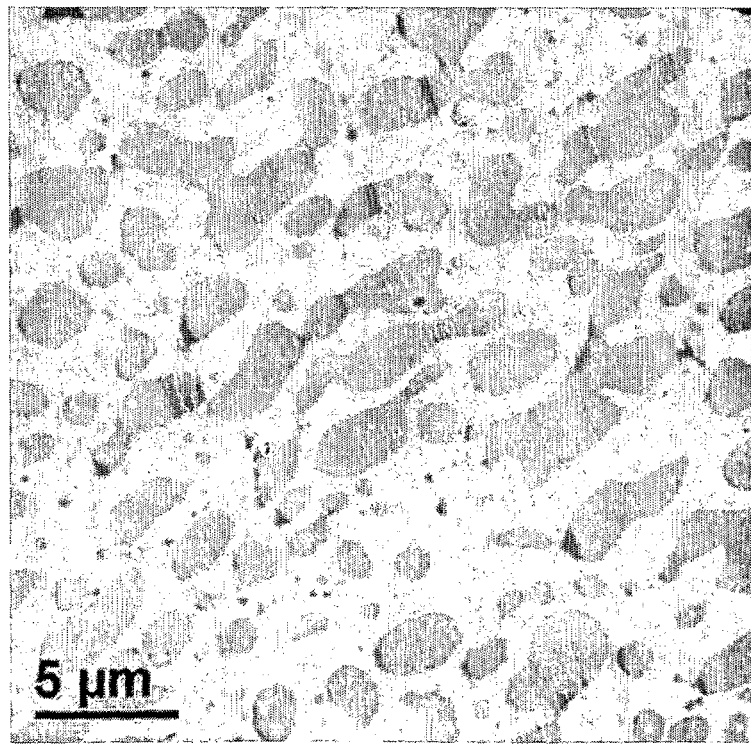
FIG. 9 is a transmission electron micrograph of a mixture of polypropylene and a random ethylene/octene copolymer (Comparative Example A[1]).
Figure 10:
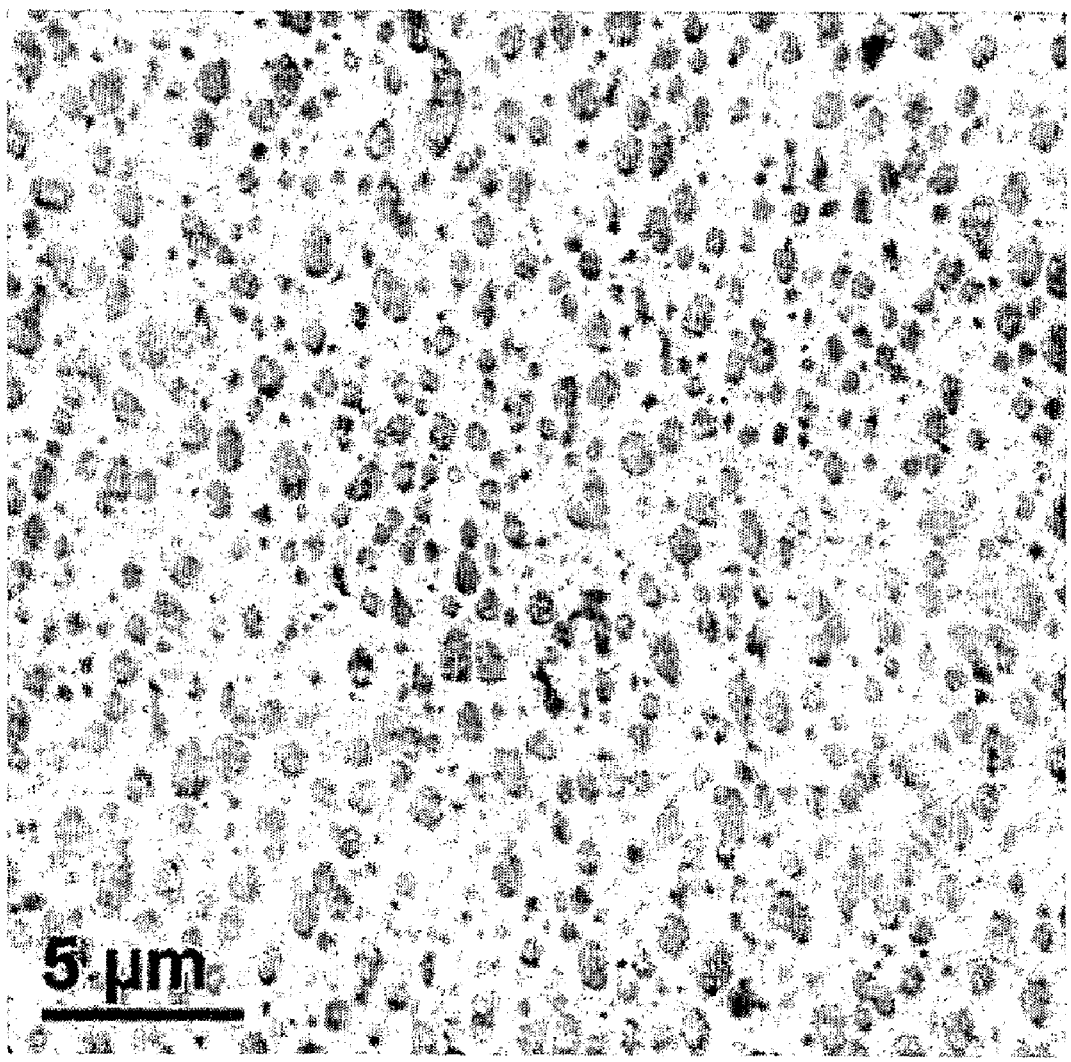
FIG. 10 is a transmission electron micrograph of a mixture of polypropylene, an ethylene-octene block copolymer (Example 20), and a random ethylene-octene copolymer (Comparative Example A[1]).

FIGS. 8 and 9 are transmission electron micrographs of Mixture 1 and Mixture 2, respectively. The dark domains are the $RuCl_3 \cdot XH_2O$ stained ethylene/1-octene polymers. As can be seen, the domains containing Polymer example 20 are much smaller than Comparative Example A[1]. The domain sizes for Polymer example 20 range from about 0.1 to about 2 μm, whereas the domain sizes for Comparative Example A[1] from about 0.2 to over 5 μm. Mixture 3 contains a 1:1 blend of Polymer example 20 and Comparative Example A[1]. It is noted that by visual inspection the domain sizes for Mixture 3 are well below those for Mixture 2, indicating that Polymer example 20 is improving the compatibility of Comparative Example A[1] with PP1.

Image analysis of Mixtures 1, 2, and 3 was performed using Leica Qwin Pro V2.4 software on 5kX TEM images. The magnification selected for image analysis depended on the number and size of particles to be analyzed. In order to allow for binary image generation, manual tracing of the elastomer particles from the TEM prints was carried out using a black Sharpie marker. The traced TEM images were scanned using a Hewlett Packard Scan Jet 4c to generate digital images. The digital images were imported into the Leica Qwin Pro V2.4 program and converted to binary images by setting a gray-level threshold to include the features of interest. Once the binary images were generated, other processing tools were used to edit images prior to image analysis. Some of these features included removing edge features, accepting or excluding features, and manually cutting features that required separation. Once the particles in the images were measured, the sizing data was exported into an Excel spreadsheet that was used to create bin ranges for the rubber particles. The sizing data was placed into appropriate bin ranges and a histogram of particle lengths (maximum particle length) versus percent frequency was generated. Parameters reported were minimum, maximum, average particle size and standard deviation. Table 10 shows the results of the image analysis

What is claimed is:

1. A molded article comprising a polymer blend comprising:
   (i) a first polyolefin;
   (ii) a second polyolefin; and
   (iii) an ethylene/α-olefin interpolymer consisting of ethylene and one or more $C_3$-$C_{20}$ linear aliphatic α-olefin monomer, wherein the first polyolefin, the second polyolefin and the ethylene/$C_3$-$C_{20}$ linear aliphatic α-olefin interpolymer are different and wherein the ethylene/$C_3$-$C_{20}$ linear aliphatic α-olefin interpolymer is a block interpolymer comprising at least about 50 mole percent ethylene and:
   (a) has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m > -2002.9 + 4538.5(d) - 2422.2(d)^2, \text{ or}$$

(b) has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T > 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or
   (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) has a storage modulus at 25° C., G'(25° C.), and a storage modulus at 100° C., G'(100° C.), wherein the ratio of G'(25° C.) to G'(100° C.) is in the range of about 1:1 to about 9:1.

2. The molded article of claim 1, wherein the ethylene/$C_3$-$C_{20}$ linear aliphatic α-olefin interpolymer has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq 858.91 - 1825.3(d) + 1112.8(d)^2.$$

3. The molded article of claim 1, wherein the ethylene/$C_3$-$C_{20}$ linear aliphatic α-olefin interpolymer has a $M_w/M_n$ from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to } 130 \text{ J/g,}$$

$$\Delta T > 48° \text{ C. for } \Delta H \text{ greater than } 130 \text{ J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

4. The molded article of claim 1, wherein the ethylene/$C_3$-$C_{20}$ linear aliphatic α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d).$$

5. The molded article of claim 4, wherein the numerical values of Re and d satisfy the following relationship:

$$Re > 1491 - 1629(d).$$

6. The molded article of claim 4, wherein the numerical values of Re and d satisfy the following relationship:

$$Re > 1501 - 1629(d).$$

7. The molded article of claim 4, wherein the numerical values of Re and d satisfy the following relationship:

$$Re > 1511 - 1629(d).$$

8. The molded article of claim 1, wherein the ethylene/$C_3$-$C_{20}$ linear aliphatic α-olefin interpolymer is an elastic polymer having an ethylene content of from 60 to 90 mole percent, a diene content of from 0.1 to 10 mole percent, and an α-olefin content from 10 to 40 mole percent.

9. The molded article of claim 1, wherein the first polyolefin is an olefin homopolymer.

10. The molded article of claim 9, wherein the olefin homopolymer is a polypropylene.

11. The molded article of claim 10, wherein the polypropylene is low density polypropylene (LDPP), high density polypropylene (HDPP), high melt strength polypropylene (HMS-PP), high impact polypropylene (HIPP), isotactic polypropylene (iPP), syndiotactic polypropylene (sPP) or a combination thereof.

12. The molded article of claim 11, wherein the polypropylene is isotactic polypropylene.

13. The molded article of claim 1, wherein the second polyolefin is an olefin copolymer, an olefin terpolymer or a combination thereof.

14. The molded article of claim 13, wherein the olefin copolymer is an ethylene/propylene copolymer (EPM).

15. The molded article of claim 13, wherein the olefin terpolymer is derived from ethylene, a monoene having 3 or more carbon atoms or a diene.

16. The molded article of claim 1, wherein the second polyolefin is a vulcanizable rubber.

17. The molded article of claim 1, wherein the molded article is a sheet or profile article.

18. A molded article comprising a polymer blend comprising:
   (i) a first polyolefin;
   (ii) a second polyolefin; and
   (iii) an ethylene/α-olefin interpolymer consisting of ethylene and one or more $C_3$-$C_{20}$ linear aliphatic α-olefin monomer, wherein the first polyolefin, the second polyolefin and the ethylene/$C_3$-$C_{20}$ linear aliphatic α-olefin interpolymer are different and wherein the ethylene/$C_3$-$C_{20}$ linear aliphatic α-olefin interpolymer is a block interpolymer comprising at least about 50 mole percent ethylene and:
   (a) has at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3 and
   (b) has an average block index greater than zero and up to about 1.0 and a molecular weight distribution, $M_w/M_n$, greater than about 1.3.

19. The molded article of claim 18, wherein the ethylene/$C_3$-$C_{20}$ linear aliphatic α-olefin interpolymer has a storage modulus at 25° C., G'(25° C.), and a storage modulus at 100° C., G'(100° C.), wherein the ratio of G'(25° C.) to G'(100° C.) is in the range of about 1:1 to about 9:1.

* * * * *